(12) United States Patent
Cohen

(10) Patent No.: US 9,949,448 B2
(45) Date of Patent: Apr. 24, 2018

(54) MODULAR IN LINE BUTTON DRIP EMITTER SYSTEM

(71) Applicant: Amirim Products Development & Patents Ltd., Yuvalim (IL)

(72) Inventor: Amir Cohen, Yuvalim (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 324 days.

(21) Appl. No.: 14/596,580

(22) Filed: Jan. 14, 2015

(65) Prior Publication Data

US 2016/0198643 A1    Jul. 14, 2016

(51) Int. Cl.
*A01G 25/02* (2006.01)
*A01G 25/00* (2006.01)

(52) U.S. Cl.
CPC ......... *A01G 25/023* (2013.01); *A01G 25/026* (2013.01); *A01G 2025/006* (2013.01)

(58) Field of Classification Search
CPC ................ A01G 25/023; A01G 25/026; A01G 2025/006
USPC ...................................... 239/542; 138/37–44
See application file for complete search history.

(56) References Cited

U.S. PATENT DOCUMENTS

| 3,667,685 | A | | 6/1972 | Rinkewich |
| 4,209,133 | A | * | 6/1980 | Mehoudar ............ A01G 25/023 137/501 |
| 4,210,287 | A | | 7/1980 | Mehoudar |
| 4,281,798 | A | * | 8/1981 | Lemelstrich ......... A01G 25/023 239/542 |
| 4,366,926 | A | * | 1/1983 | Mehoudar ............ A01G 25/023 239/542 |
| 4,369,923 | A | | 1/1983 | Bron |
| 4,533,083 | A | | 8/1985 | Tucker |
| 4,850,531 | A | * | 7/1989 | Littleton .............. A01G 25/023 239/1 |

(Continued)

FOREIGN PATENT DOCUMENTS

| WO | WO 92/05689 | 4/1992 |
| WO | WO 98/10635 | 3/1998 |

(Continued)

OTHER PUBLICATIONS

Written Opinion dated Jan. 25, 2017 From the International Preliminary Examining Authority Re. Application No. PCT/IL2016/050045. (7 Pages).

(Continued)

*Primary Examiner* — Arthur O Hall
*Assistant Examiner* — Joseph A Greenlund

(57) ABSTRACT

A modular in-line drip emitter may include a flow restrictor and a replaceable attachment. The flow restrictor may provide fluid communication between an inlet and a fluid outlet chamber. The flow restrictor may include rate limiting fluid path producing a predefined range of flow rate over a predefined pressure differential range between the fluid inlet and the fluid outlet. The attachment may be sized and shaped to mount to the flow restrictor. In some embodiments the attachment includes an inlet opening oriented for receiving fluid from a conduit and a fluid outlet attachable to the fluid inlet of the flow restrictor. In some embodiments the attachment includes a sleeve fitting into a conduit with an annular outlet chamber attachable to the outlet chamber of the flow restrictor.

21 Claims, 21 Drawing Sheets

(56) References Cited

U.S. PATENT DOCUMENTS

| | | | | |
|---|---|---|---|---|
| 5,137,216 | A * | 8/1992 | Hanish | A01G 25/023 239/542 |
| 5,183,208 | A * | 2/1993 | Cohen | A01G 25/023 239/542 |
| 5,279,462 | A * | 1/1994 | Mehoudar | A01G 25/023 239/533.13 |
| 5,294,058 | A | 3/1994 | Einav | |
| 5,295,506 | A * | 3/1994 | Smith | E03C 1/104 137/271 |
| 5,443,212 | A * | 8/1995 | Dinur | A01G 25/023 239/542 |
| 5,636,797 | A | 6/1997 | Cohen | |
| 5,820,028 | A * | 10/1998 | Dinur | B05B 1/083 239/542 |
| 6,027,048 | A | 2/2000 | Mehoudar | |
| 6,206,305 | B1 | 3/2001 | Mehoudar | |
| 6,250,571 | B1 * | 6/2001 | Cohen | A01G 25/023 239/533.1 |
| 6,302,338 | B1 * | 10/2001 | Cohen | A01G 25/023 137/614.2 |
| 6,481,645 | B1 * | 11/2002 | Taylor-McCune | B05B 1/28 222/144.5 |
| 6,568,607 | B2 * | 5/2003 | Boswell | A01G 25/023 239/542 |
| 6,698,629 | B2 * | 3/2004 | Taylor-McCune | B67D 1/101 222/108 |
| 7,270,280 | B2 * | 9/2007 | Belford | A01G 25/023 138/42 |
| 7,681,810 | B2 | 3/2010 | Keren | |
| 8,141,589 | B2 * | 3/2012 | Socolsky | A01G 25/023 138/37 |
| 8,317,111 | B2 * | 11/2012 | Cohen | A01G 25/023 239/542 |
| 8,511,586 | B2 * | 8/2013 | Einav | A01G 25/023 138/42 |
| 9,022,059 | B2 * | 5/2015 | Cohen | A01G 25/023 137/315.05 |
| 9,307,705 | B2 * | 4/2016 | Akritanakis | A01G 25/023 |
| 9,462,760 | B2 * | 10/2016 | Cohen | A01G 25/02 |
| 2005/0284966 | A1 * | 12/2005 | DeFrank | A01G 25/023 239/542 |
| 2009/0212135 | A1 | 8/2009 | Keren | |
| 2010/0237170 | A1 | 9/2010 | Rosenberg et al. | |
| 2012/0012682 | A1 * | 1/2012 | Einav | B05B 1/20 239/542 |
| 2012/0097254 | A1 | 4/2012 | Cohen | |
| 2012/0267454 | A1 * | 10/2012 | Einav | A01G 25/023 239/542 |
| 2013/0248616 | A1 * | 9/2013 | Ensworth | A01G 25/026 239/11 |
| 2014/0246520 | A1 * | 9/2014 | Einav | A01G 25/023 239/542 |
| 2015/0012682 | A1 * | 1/2015 | Yang | G06F 3/14 710/316 |
| 2015/0014446 | A1 | 1/2015 | Cohen | |
| 2015/0289458 | A1 | 10/2015 | Cohen | |
| 2016/0198643 | A1 * | 7/2016 | Cohen | A01G 25/026 239/542 |
| 2017/0290277 | A1 | 10/2017 | Cohen | |

FOREIGN PATENT DOCUMENTS

| | | |
|---|---|---|
| WO | WO 99/33571 | 7/1999 |
| WO | WO 2011/092557 | 8/2011 |
| WO | WO 2012/015655 | 2/2012 |
| WO | WO 2012/038766 | 3/2012 |
| WO | WO 2015/004652 | 1/2015 |
| WO | WO 2016/113739 | 7/2016 |

OTHER PUBLICATIONS

International Search Report and the Written Opinion dated Jun. 14, 2016 From the International Searching Authority Re. Application No. PCT/IL2016/050045.
Official Action dated Jun. 29, 2016 From the US Patent and Trademark Office Re. U.S. Appl. No. 14/746,868.
Restriction Official Action dated Apr. 6, 2016 From the US Patent and Trademark Office Re. U.S. Appl. No. 14/746,868.
International Preliminary Report on Patentability dated Jan. 21, 2016 From the International Bureau of WIPO Re. Application No. PCT/IL2014/050586.
Official Action dated Jan. 13, 2016 From the US Patent and Trademark Office Re. U.S. Appl. No. 13/937,294.
Official Action dated Jul. 16, 2015 From the US Patent and Trademark Office Re. U.S. Appl. No. 13/937,294.
Examination Report dated Mar. 14, 2017 From the Australian Government, IP Australia Re. Application No. 2014288784. (2 Pages).
Communication Relating to the Results of the Partial International Search dated Apr. 7, 2016 From the International Searching Authority Re. Application No. PCT/IL2016/050045.
International Search Report and the Written Opinion dated Nov. 5, 2014 From the International Searching Authority Re. Application No. PCT/IL2014/050586.
Restriction Official Action dated Apr. 16, 2015 From the US Patent and Trademark Office Re. U.S. Appl. No. 13/937,294.
Notification of Office Action and Search Report dated Sep. 28, 2017 From the State Intellectual Property Office of the People's Republic of China Re. Application No. 201480039100.3 and Its Summary in English. (14 Pages).
International Preliminary Report on Patentability dated Apr. 20, 2017 From the International Preliminary Examining Authority Re. Application No. PCT/IL2016/050045. (21 Pages).
Translation of Notification of Office Action dated Sep. 28, 2017 From the State Intellectual Property Office of the People's Republic of China Re. Application No. 201480039100.3. (14 Pages).

* cited by examiner

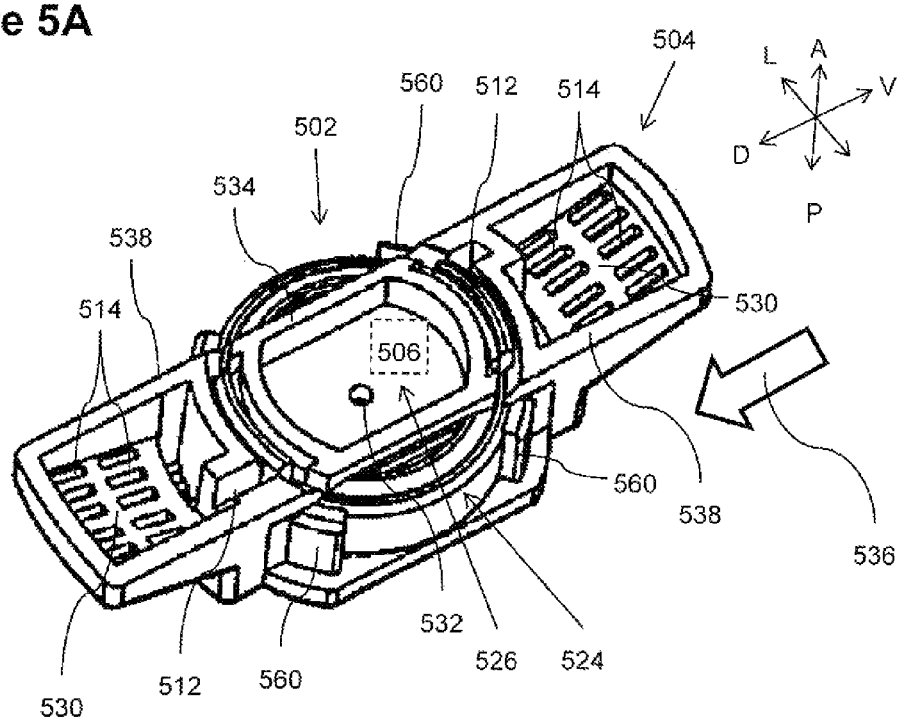
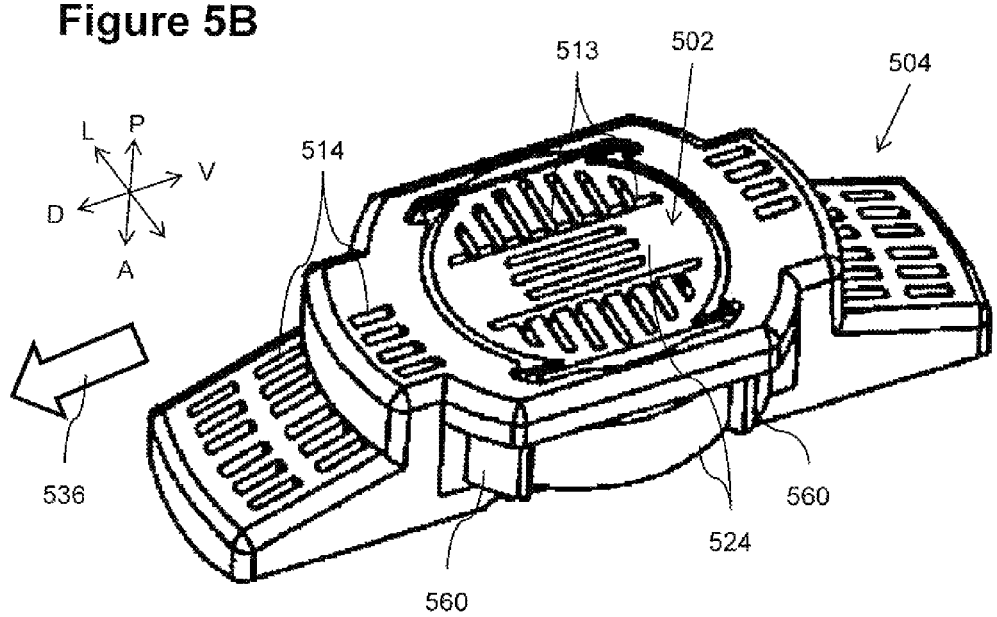

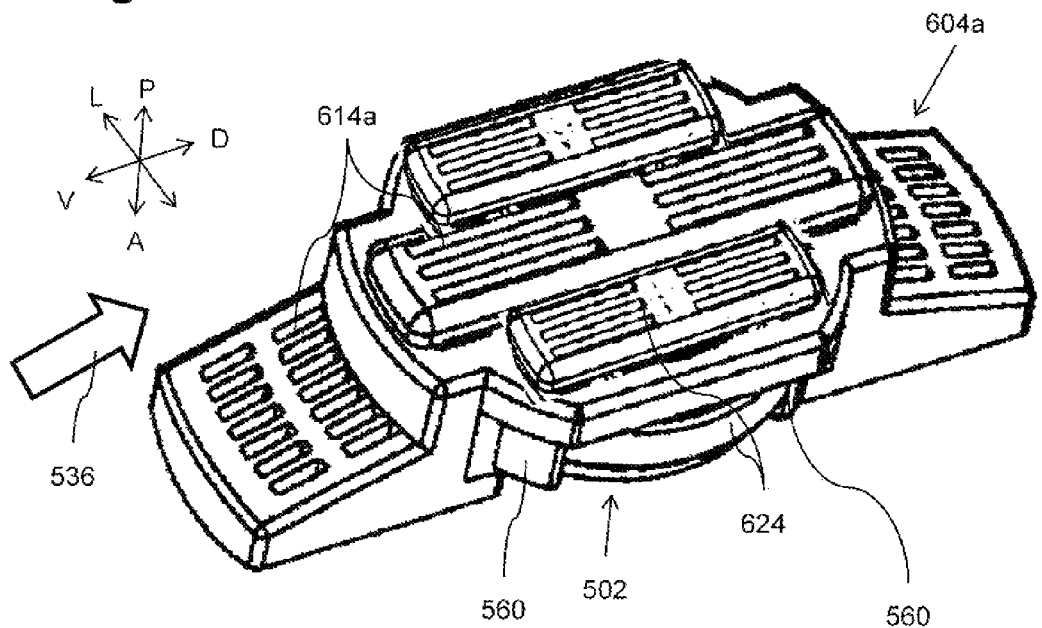
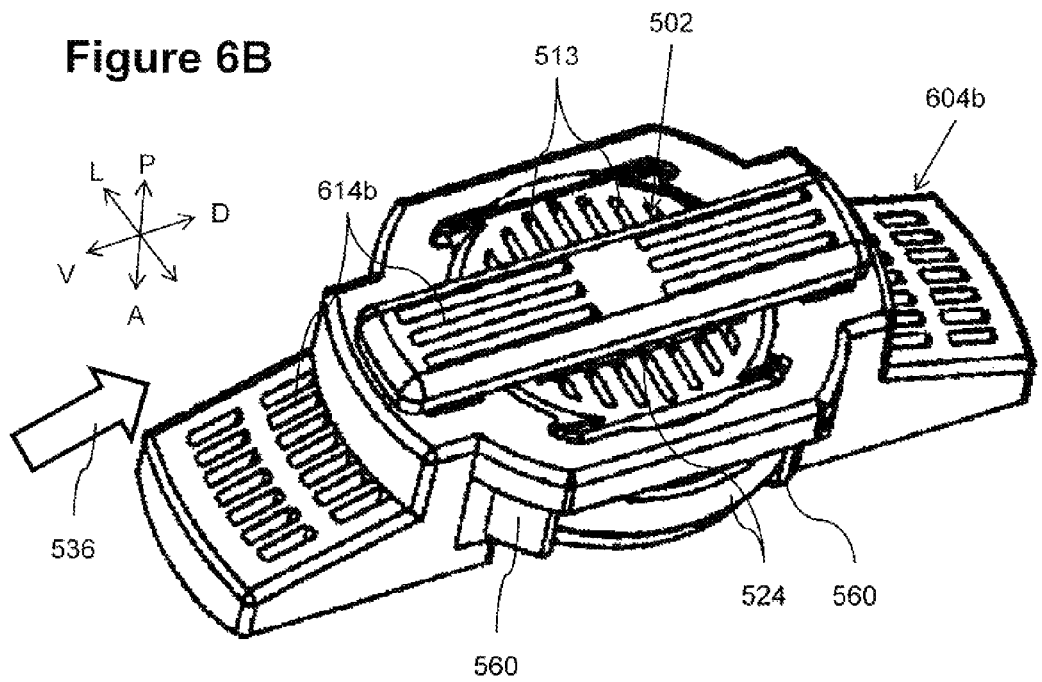

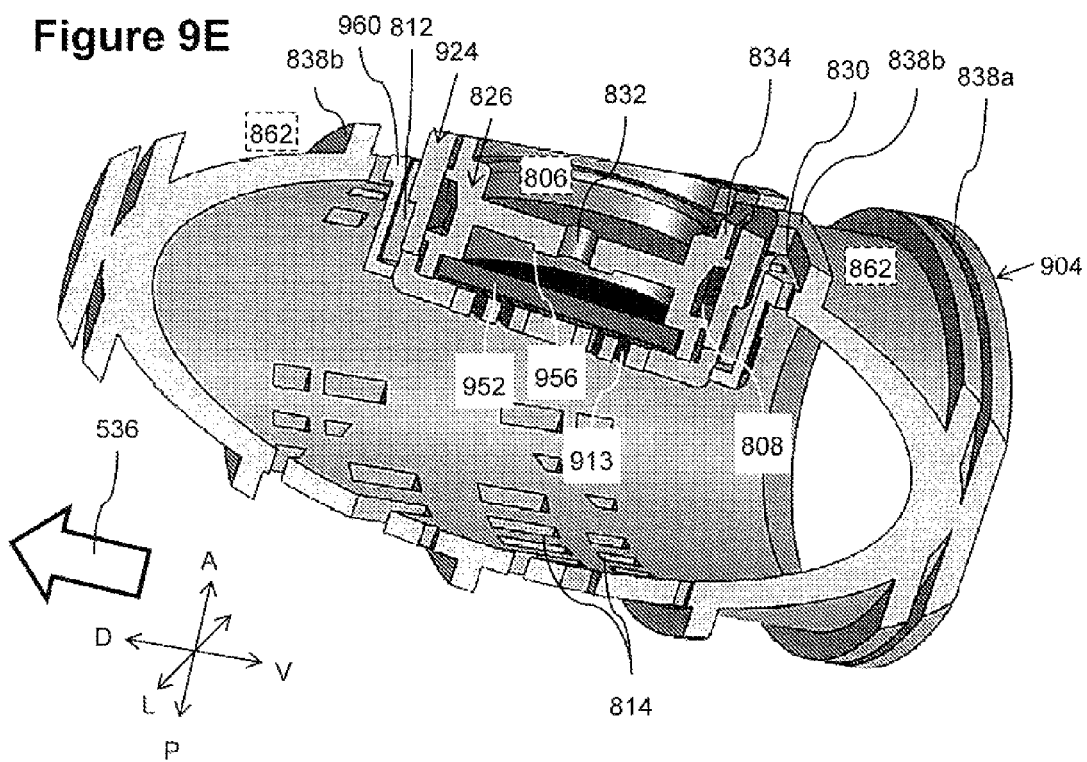
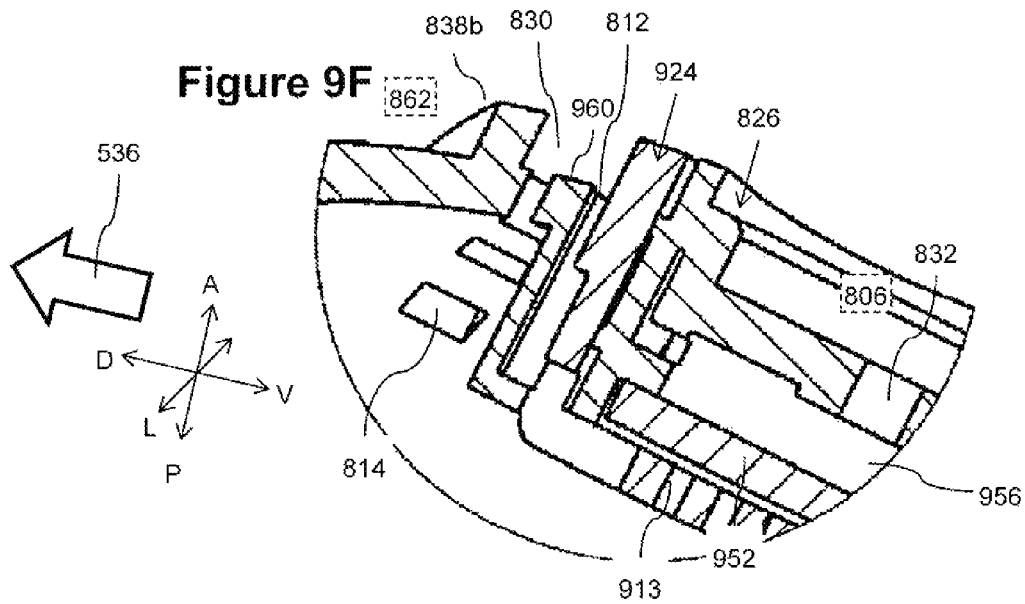

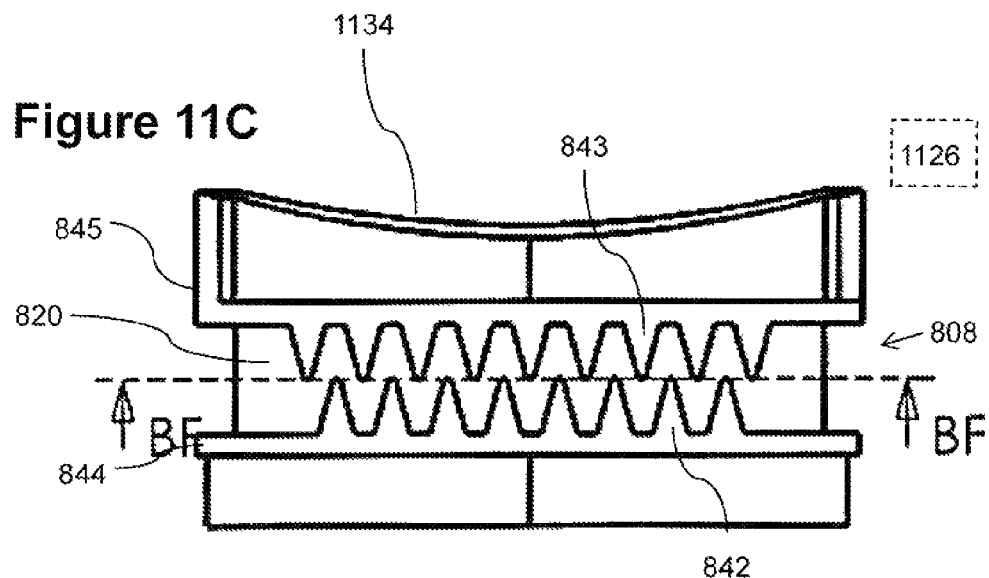
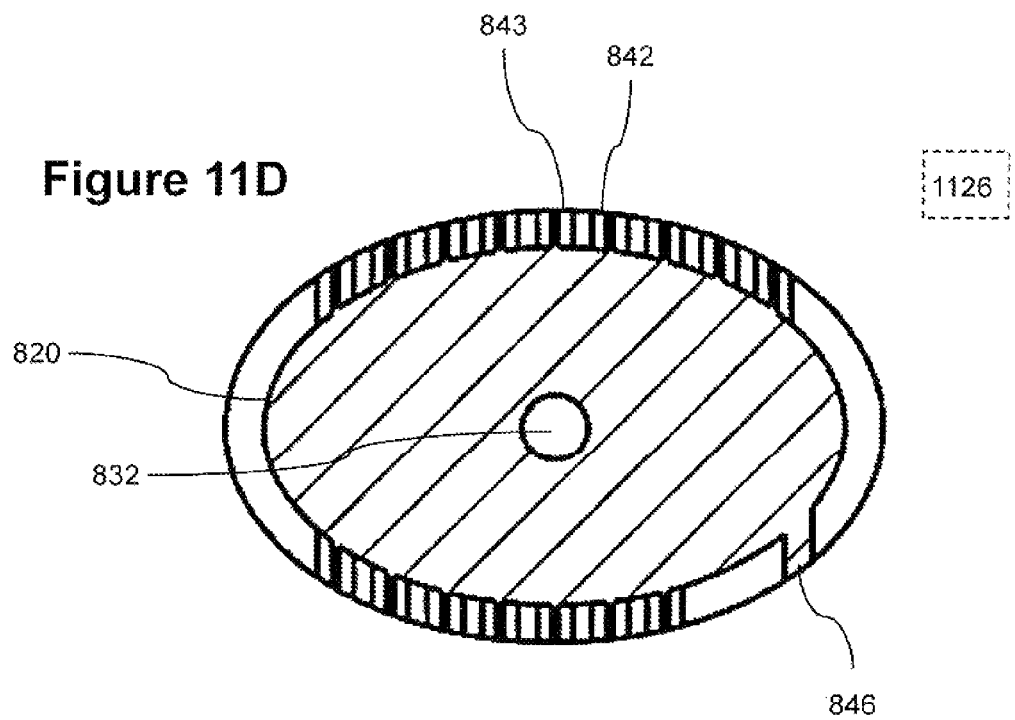

MODULAR IN LINE BUTTON DRIP EMITTER SYSTEM

RELATED APPLICATION

This application is related to U.S. patent application Ser. No. 13/937,294 filed Jul. 9, 2013, the contents of which are incorporated herein by reference in their entirety.

FIELD AND BACKGROUND OF THE INVENTION

The present invention, in some embodiments thereof, relates to an in hose drip emitter and, more particularly, but not exclusively, an in hose drip emitter having a cylindrical core and one or more attachments.

International Patent Application Publication No. WO/1992/005689 to Dermitzakis discloses "an irrigation pipe with dripping elements soldered to its inner side made of a continuous plastic pipe which does not have however a constant cross-sectional area over its whole length. The dripping element may be designed either as a simple meander or other channel shape or have a pressure-compensating function. In the embodiment with pressure-compensating function, a constant water outflow rate from the dripping element is ensured within a determined pressure range. The dripping elements are successively introduced into the pipe during the production phase of the latter, are enveloped by the sheath of the pipe and secured to the inner wall of the pipe. The sheath of the pipe forms outer bulges at these locations. The cross-section of the irrigation pipe remains absolutely free over its whole length. The dripping element may also be provided with a small water outlet pipe which clearly projects from the outer side of the pipe."

U.S. Pat. No. 7,270,280 to Belford discloses "an integral in-line dripper to be used bonded to the internal surface of an irrigation pipe. The dripper has an inlet facing the inside of the pipe and an outlet connected to an exit opening in the pipe wall. The dripper has a flattened shape defined between a first surface with an open meandering channel formed therein, the channel's inlet being connected to the dripper's inlet, and a second surface opposite the first surface. The topography of the first surface is so designed that the dripper can be bonded to the internal surface of the pipe in any orientation about a radius of the pipe passing through the first and the second surface, so as to form a flow-restriction labyrinth connected to the outlet of the dripper."

U.S. Pat. No. 5,636,797 to Cohen discloses "a drip irrigation emitter including a tube having a plurality of flow control units bonded to its inner face providing a flow control passageway between the interior of the tube and each of a plurality of discharge openings formed through the wall of the tube. Each flow control unit includes a body member bonded to the inner face of the tube, a cover also bonded to the inner face of the tube, and a deformable elastomeric membrane between the body member and cover and defining a pressure-compensated flow control passageway through the flow control unit. A drip irrigation emitter includes a body member having an inlet for receiving pressurized water, an outlet, and a connecting passageway having a plurality of baffles spaced from each other in the direction of the water flow from the inlet to the outlet to define a labyrinth flow path cooperable with a deformable membrane which regulates the flow through the labyrinth flow path in response to the inlet pressure. The baffles are formed with notches in the sides thereof facing the membrane such that the membrane is deformed by an increase in the inlet pressure first into engagement with the sides of the baffles facing the membrane, and then into the notches, to regulate the flow to the outlet." According to Cohen, "The inner face of body member 10 (i.e., the face exposed to the interior of tube 2) is formed with a flat outer rim 13 (FIGS. 5A-5G) of generally rectangular configuration for seating the cover 30 . . . . The longitudinal side sections 34, 35 of cover 30 are further formed with curved surfaces 34b, 35b, conforming to the curvature of tube 2."

U.S. Pat. No. 6,206,305 and U.S. Pat. No. 6,027,048 to Mehoudar disclose "an emitter unit to be integrally bonded to an internal surface of a conduit and comprising an elongated housing, a housing inlet adapted to communicate with an interior of said conduit and a housing outlet adapted to communicate with a conduit outlet. An elongated, flow-restricting flowpath is formed in the housing having a flowpath inlet communicating with the housing inlet and a flowpath outlet communicating with the housing outlet. A resiliently flexible membrane is mounted in the housing which is of closed box-like shape and is constituted by an elongated receiving member and a correspondingly elongated cover member. Projections and recesses are formed along the lengths of elongated rim portions of the members and are directed transversely to longitudinal axes of said members such that projections of one member are adapted to form a close pressure fit within corresponding recesses of the other member."

U.S. Pat. No. 5,279,462 to Mehoudar discloses "an irrigation emitter unit comprising an outer member of substantially cylindrical shape and having a tapering base portion with fluid flow coupling means; an inwardly directed peripherally flanged edge portion of the outer member; an inner member having a body portion of substantially cylindrical shape substantially sealingly fitted within the outer member and having a cover portion formed integrally therewith; a peripheral edge portion of the cover portion juxtaposed below the flanged edge portion of the outer member; an elongated groove formed in the cylindrical surface of the body portion; a cavity formed in the body portion and communicating at one end thereof with a fluid flow inlet; an inwardly directed flange formed integrally with the walls of the cavity; and a resiliently flexible membrane located within the unit."

U.S. Pat. No. 4,209,133 to Mehoudar discloses "a drip level irrigation emitter unit having flow restricting means, a control mechanism, inlet and outlet control chambers of the control mechanism, resiliently flexible membrane sealingly separating the control chambers, the membrane being displaceable with respect to the flow restricting means, the inlet and outlet chambers respectively communicating with an inlet and an outlet of the flow restricting means, the outlet chamber being formed with an outlet aperture of substantially smaller area than that of the membrane, the arrangement being such that upon the liquid pressure in the inlet chamber exceeding the liquid pressure in the outlet chamber by a predetermined amount, the membrane flexes elastically towards the outlet aperture so as to define, with a rim of the aperture, a restricted outflow path thereby limiting variations in the outflow rate."

U.S. Pat. No. 7,681,810 to Keren discloses "an emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture."

U.S. Patent Application Publication No. 2012/0097254 to Cohen discloses "an apparatus for a self adjusting regulator suited for an irrigation emitter. A curved flow channel is integrated into a concave dome shaped surface. A deformable member deforms to approach the surface to adjust the resistance to flow. The concave dome shaped surface may match a deformed shape of the membrane. Irregularities in the interface between the surface and the deformable member are configured to achieve a desired discharge under varying flow conditions. The deformable member may activate an inlet filter cleaner by pushing a ram and thereby unclogging the filter."

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided an in-line drip emitter including a flow restrictor. The flow restrictor may including one or more fluid inlets, a fluid outlet chamber having an open face suitable for sealing to an inner surface of a conduit over less than the circumference thereof, a rate limiting fluid path providing fluid communication between the one or more fluid inlets and the fluid outlet chamber, the rate limiting fluid path producing a predefined range of flow rate over a predefined pressure differential range between the one or more fluid inlets and the fluid outlet. The emitter may further include an inlet attachment sized and shaped to mount to the flow restrictor. The flow inlet attachment may include an inlet opening oriented for receiving fluid from the conduit, one or more fluid outlets and a mount sized to engage the flow restrictor from at least two opposing sides thereof with the flow restrictor oriented for exposing the open face of the fluid outlet chamber for the sealing to the inner surface of a conduit and aligning each of the one or more fluid outlets to at least one fluid inlet of the one or more fluid inlets of the flow restrictor.

According to some embodiments of the invention, the mount includes opposing surfaces for hold the flow restrictor by compression.

According to some embodiments of the invention, the inlet attachment further includes: an open faced inlet chamber suitable for sealing to the inner surface of the conduit, the inlet chamber providing fluid communication between the inlet opening and the one or more fluid outlets.

According to some embodiments of the invention, the inlet attachment further includes: an open faced outlet chamber suitable for sealing to an inner surface of a conduit, the outlet chamber providing fluid communication between the outlet chamber of the flow restrictor and an outlet opening of the conduit.

According to some embodiments of the invention, the inlet attachment has the form of a sleeve insertable into the conduit.

According to some embodiments of the invention, the inlet attachment has the form of a sleeve insertable into the conduit and wherein the outlet chamber of the inlet attachment surrounds at least 70% of a circumference of the sleeve.

According to some embodiments of the invention, the in-line dripper further includes: a longitudinal extension of the sleeve and wherein the outlet chamber of the inlet attachment surrounds at least 90% of a circumference of the longitudinal extension.

According to some embodiments of the invention, the outlet chamber of the flow restrictor is formed on an anterior face thereof and the flow restrictor further includes: a curved outer surface and wherein at least a portion of the rate limiting fluid path is at least partially delimited by a portion of the curved outer surface and revolves at least partially around a longitudinal axis of the flow restrictor.

According to some embodiments of the invention, the in line dripper further includes: a smooth sealing surface surrounding the curved surface.

According to some embodiments of the invention, the in-line dripper further comprises: a cover including an interior lateral surface and wherein the at least a portion of the rate limiting fluid path is enclosed between the curved outer surface and the inner surface of the cover.

According to some embodiments of the invention, the one or more fluid outlets are in the cover.

According to some embodiments of the invention, the rate limiting fluid path is at least partially delimited in an anterior direction by an outward protrusion from the curved outer surface.

According to some embodiments of the invention, the rate limiting fluid path is at least partially delimited in a posterior direction by an outward protrusion from the curved outer surface.

According to some embodiments of the invention, the rate limiting fluid path is at least partially delimited in a posterior direction by an inward protrusion from the inner surface.

According to some embodiments of the invention, a traverse cross section of the flow restrictor has a long axis and a short axis and wherein a ratio of the long axis and short axis is at least 1.1 to 1.

According to some embodiments of the invention, the long axis is oriented substantially parallel to a mean flow direction in the conduit.

According to an aspect of some embodiments of the invention, there is provided a drip emitter including: a flow restrictor producing a predefined range of flow rate over a predefined pressure differential range. The flow restrictor may include: a fluid inlet, a fluid outlet having a periphery suitable for bonding to an inner surface of a conduit over less than the circumference thereof; and a flow restricting fluid path. The drip emitter may further include an attachment mountable to the flow restrictor including: a slow release ingredient at a concentration at least 20 times the concentration in the flow restrictor, a inlet opening a duct providing fluid communication between inlet opening and the inlet of the flow restrictor.

According to an aspect of some embodiments of the invention, there is provided a drip regulation emitter including: a core. The core may include: a closed perimeter fluid outlet chamber facing in an anterior direction a perimeter of the outlet chamber suitable for bonding to an inner surface of a conduit over less than the circumference thereof; an curved lateral surface; a side opening between the fluid outlet chamber and the curved lateral surface; a first set of baffles arranged around the curved lateral surface of the core. The emitter may further include: a cover fitting over the core. The cover may include: a curved inner surface sealing fitting to the curved lateral surface of the core; a fluid inlet; a fluid duct connecting between the fluid inlet and an annular region confined between the curved lateral surface of the core and the curved inner surface of the cover; and a second set of baffles arranged along the curved inner surface of the cover, the second set of baffles spaced to cooperate with the first set of baffles of the core to produce a labyrinth flow path around the annular region between the fluid inlet and the side opening.

According to some embodiments of the invention, the core further includes a regulating chamber interposing between the side opening and the outlet chamber; the regulating chamber having an open end directed in a posterior direction.

According to some embodiments of the invention, the drip emitter further comprises: a flexible membrane interposed between the fluid inlet of the cover and the open end of the regulating chamber.

According to an aspect of some embodiments of the invention, there is provided a drip emitter including a cover. The cover may include a cavity a curved inner surface and a long axis and a short axis, a fluid inlet. The emitter may also include a flexible membrane and a core formed as a non-circular cross section fitting into the cavity. The core may include; a fluid outlet chamber, the fluid outlet chamber having an open face directed toward a first end of the core a perimeter of the open face suitable for bonding to an inner surface of a conduit over less than the circumference thereof with a long axis of the elliptical cross section directed substantially parallel to the main flow direction in the conduit; a regulating chamber having an open face directed towards a second end of the core opposite the first end, the regulating chamber in fluid communication with the fluid outlet chamber; and at least one open faced labyrinth flow channel on at least one long side of an outer curved surface of the core, when the core is fit into the cavity, the labyrinth flow channel providing fluid communication between the fluid inlet of the cover and the regulating chamber.

According to some embodiments of the invention, the cross section is elliptical.

According to an aspect of some embodiments of the invention, there is provided an insert for a dripper hose including: a mount shaped and sized to hold a flow restrictor; an axial extension; a fluid outlet chamber girdling the axial extension; the outlet chamber having an open face suitable for sealing to an inner surface of a conduit over the circumference thereof; a channel providing fluid communication between an outlet of the flow restrictor and the outlet chamber.

According to an aspect of some embodiments of the invention, there is provided an emitter including: a flow restrictor including: a fluid inlet, a fluid outlet; and a fluid path producing a predefined range of flow rate over a predefined pressure differential range between the fluid inlet and the fluid outlet; and a curved outer surface and wherein at least a portion of the rate limiting fluid path is at least partially delimited by a portion of the curved outer surface and revolves at least partially around a longitudinal axis of the flow restrictor. The emitter may further include a sleeve sized to insert into a conduit the sleeve including: an annular outlet open faced outlet chamber attachable to the outlet of the flow restrictor, a periphery of the annular outlet chamber contacting an inner wall over at least 70% of a circumference thereof amount for engaging to the flow restrictor.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5A is an anterior perspective view of a flow restrictor and an inlet attachment in accordance with an embodiment of the present invention;

FIG. 5B is a posterior perspective view of a flow restrictor with an inlet attachment in accordance with an embodiment of the present invention;

FIG. 6A is a posterior perspective view of a flow restrictor with a complete inlet attachment in accordance with an embodiment of the present invention;

FIG. 6B is a posterior perspective view of a flow restrictor with a semi-complete inlet attachment in accordance with an embodiment of the present invention;

FIG. 9E is an oblique cross-sectional view of a cylindrical hose insert with a mount and a flow restrictor in accordance with an embodiment of the present invention;

FIG. 9F is a close up oblique cross-sectional view of a cylindrical hose insert with a mount and a flow restrictor in accordance with an embodiment of the present invention;

FIG. 11C is a lateral view of an elliptical flow restrictor core in accordance with an embodiment of the present invention; and FIG. 11D is a cross sectional view of an elliptical flow restrictor core in accordance with an embodiment of the present invention.

DESCRIPTION OF SPECIFIC EMBODIMENTS OF THE INVENTION

Figure 1:
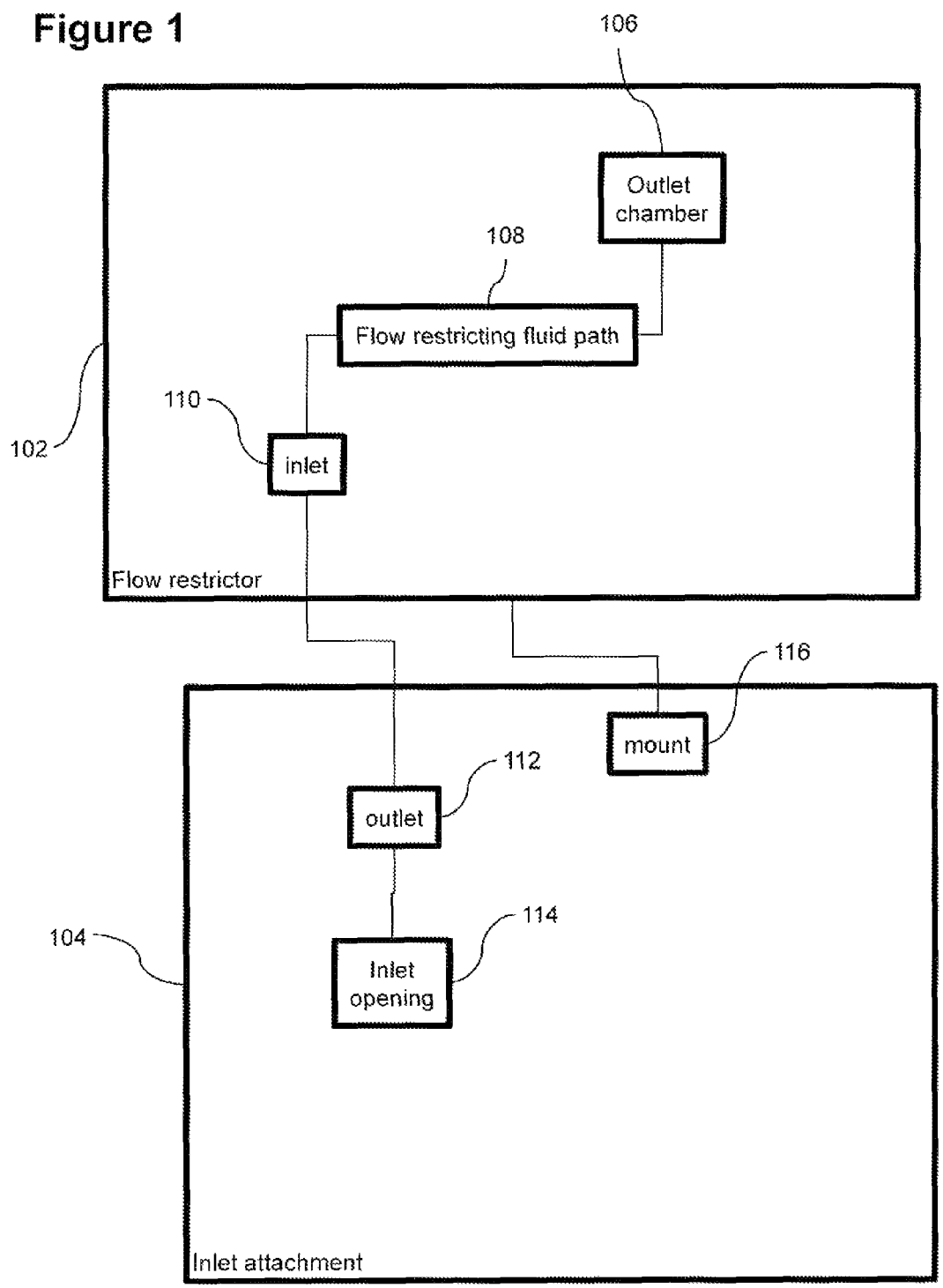
FIG. 1 is a block diagram illustrating a flow restrictor and an inlet attachment in accordance with an embodiment of the present invention.

The present invention, in some embodiments thereof, relates to an in hose drip emitter and, more particularly, but not exclusively, an in hose drip emitter having a cylindrical flow restrictor and one or more attachments.

Overview

Inlet Attachment for a Flow Restrictor

An aspect of some embodiments the current invention relates to an inlet attachment for an in-hose flow restrictor. For example the flow restrictor may be included in a drip emitter conduit. Optionally, a single flow regulator may be suitable for use autonomously and/or with one or more inlet attachments. For example a different attachment may be suitable for different applications and/or performance requirements and/or for fitting to different sized conduit. For example, the inlet attachment may include a slow release chemical and/or a filter. Optionally the slow release chemical may not be included in the flow restrictor. For example the concentration of the slow release chemical in the flow restrictor may be between $\frac{1}{2}$ and $\frac{1}{5}$ the concentration in the attachment and/or between $\frac{1}{5}$ and $\frac{1}{20}$ the concentration in the attachment and/or less than $\frac{1}{20}$ the concentration in the attachment.

In some embodiments, a flow regulator and/or an inlet attachment may attach and/or be bonded to less than half the circumference of an inner wall of an irrigation hose. For example an angular extent of a boding zone may be less than 45°. Alternatively or additionally, in some embodiments, the angular extent of the bonding zone may be between 20° and 180°. Alternatively or additionally, in some embodiments, the angular extent of the bonding zone may be greater than 180°. Alternatively or additionally the inlet attachment may take the form of a hose insert, for example including a cylindrical sleeve for inserting into an irrigation hose. The sleeve may contact an inner wall over the entire circumference thereof and/or a part thereof for example ranging between 30 to 50% and/or between 50 to 70% and/or between 70 to 90% and/or between 90 to 100%.

In some embodiments, an inlet of the flow restrictor may be connected and/or in fluid communication with an outlet duct of the inlet attachment. Optionally, the flow restrictor may be configured for autonomous operation, for example as an in-line drip emitter. The outlet duct of the inlet attachment may optionally connect to the inlet that is used by the flow restrictor in autonomous operation (for example including a filter of the autonomous dripper). Alternatively or additionally, the outlet duct of the inlet attachment may optionally connect to a special inlet of the flow restrictor for attachment to the inlet attachment. Optionally, attachment to the inlet connector may open an inlet of the flow restrictor. Optionally substantially all fluid entering the flow restrictor may pass through the inlet attachment. Alternatively or additionally, some fluid may enter the flow restrictor through the inlet attachment and/or some fluid may enter the flow restrictor without passing through the inlet attachment.

In some embodiments, an inlet attachment of a dripper may include a filter for fluid entering a flow restrictor. For example, the filter of the inlet attachment may act as a prefilter with respect to the inlet filter of the flow restrictor. Optionally, the flow restrictor may include its own filter. In some embodiments, the input attachment may include a filter with a larger area. Alternatively or additionally, the filter of the inlet attachment may be courser than the inlet filter of the flow restrictor. For example the area of the filter of the inlet attachment may range between 1.5 to 3 times the area of the filter of the flow restrictor and/or between 3 to 10 times the area of the filter of the flow restrictor and/or between 10 to 100 times the area of the filter of the flow restrictor Alternatively or additionally, the filter of the inlet attachment may be finer than the inlet filter of the flow restrictor.

Outlet Attachment for a Flow Restrictor

An aspect of some embodiments the current invention relates to an outlet attachment for an in-hose flow restrictor. For example the flow restrictor may be included in a drip emitter conduit. For example, the outlet attachment may include a sleeve for insertion into a conduit, for example an irrigation hose. For example the outlet attachment may include an outlet chamber in fluid communication with an outlet chamber of the flow restrictor. Optionally the outlet chamber of the outlet attachment may have an annular geometry and/or may encircle the longitudinal axis of the sleeve. For example the sleeve may be inserted into a conduit and/or the outlet chamber of the sleeve may link to an outlet opening for example a hole and/or perforation of the conduit independent of the rotational orientation of the sleeve around its longitudinal axis. Optionally, the sleeve may include multiple outlet chambers. For example the sleeve may include dual outlet chambers on or near both ends of the sleeve. For example the sleeve may be inserted into a conduit and/or the outlet chamber of the sleeve may link to an outlet hole and/or perforation of the conduit independent of the longitudinal orientation of the sleeve. Alternatively or additionally, an outlet attachment may attach to the inside wall of a conduit over less than half a circumference thereof.

In some embodiments, an attachment for a flow restrictor may include both an inlet attachment and an outlet attachment. Optionally a single flow restrictor may be suitable to fit to different attachments for example for different applications and/or different conduit sizes. For example the attachment may fit ½ inch tubes and/or ¼ inch tubes. For example the tube may have a diameter ranging between 50 mm to 35 mm and/or from 35 mm to 30 mm and/or from 30 mm to 5 mm. The conduit wall thickness may range for example between 3 to 4 mm and/or between 2 and 3 mm and/or between 0.3 and 2 mm. The length of the sleeve may range for example between 1 to 3 cm and/or between 3 to 6 cm and/or between 6 to 9 cm. The width of the outlet channel of the sleeve may range for example between 5 and 10 mm and/or between 10 to 15 mm and/or between 15 to 20 mm and/or between 20 to 40 mm. The diameter of the perforations in the conduit wall may range for example between 0.1 to 0.7 mm and/or between 0.7 to 1.3 mm and/or between 1.3 to 2 mm and/or greater than 2 mm.

Optionally, snaps, interference elements, friction, a compression fit, welding and/or glue may be used to engage a flow restrictor and/or to hold an inlet and/or outlet attachment to a flow restrictor. Optionally the connection to a conduit holds an assembly (for example flow restrictor core and/or flow restrictor cover and/or attachment) together.

Eccentric Form Flow Restrictors

An aspect of some embodiments of the current invention relates to a flow restrictor having a non-circular shape, for example an eccentric shape. For example the flow restrictor may have a smooth and/or rounded shape with a long axis and/or a short axis. For example the flow restrictor may have an ellipsoid shape and/or the form of a cylinder with an elliptical cross section. Optionally, the flow restrictor may be mounted to a conduit (for example an irrigation hose) and/or an inlet attachment and/or an outlet attachment with the long axis substantially parallel to the mean flow direction in the conduit. In some embodiments, the cross section of the flow restrictor may be asymmetrical, for example egg shaped. Alternatively or additionally the cross section may have the shape of a rounded rectangle and/or parallelogram. Optionally an egg shaped emitter may be oriented for reduced drag. For example a wide end of an egg shaped emitter may be oriented upstream and/or a narrow end oriented downstream. Optionally, the aspect ratio of the axis of the flow restrictor may range between 1.01 to 1.1 and/or between 1.1 to 1.4 and/or between 1.4 to 2.0 and/or between 2.0 to 4.0 and/or greater than 4.

In some embodiments an eccentric rounded flow restrictor may include a core with a circumferential rate limiting flowpath. For example, the rate limiting flowpath may connect between inlet and an outlet of the flow restrictor. The rate limiting flowpath optionally includes a portion formed in a sidewall of the flow restricting core. For example the sidewall may be curved. Optionally the rate limiting flowpath includes one or more portions formed on opposite sidewalls by slip molding (for example a mold may include two portions that are separated by movement substantially perpendicular to the long axis of the core). Optionally, the rate limiting flowpath includes a portion formed on a long side of the core. For example the rate limiting flowpath may include a labyrinth flow path.

When fitting the dripper to the inside surface of the conduit, it may optionally be desirable to align the profile of the bonding surface to the axis of the conduit. A conventional button drip emitter, having axial symmetry, may lack an obvious external feature by which to judge the orientation of the bonding surface and its alignment with the conduit.

In some embodiments of the present invention an optional orientation element may facilitate orientation in one or more axes. For example, a bonding surface may be oriented toward the conduit wall. The bonding surface may optionally be oriented also with respect to the axis of the conduit. For example in some embodiments the bonding surface is curved to fit the internal cylindrical side of the conduit. In such a case, the bonding surface may be oriented parallel to the conduit. For example, an alignment element may include a flat surface and/or a pair of parallel flat surfaces. The flat surface may be aligned with the axis of the conduit. For example, the orientation element may include a step and or a protrusion that is aligned towards a wall of the conduit. In some embodiments the orientation element may be on an outlet attachment and/or on a core of the flow restrictor and/or on a cover thereof.

Flow Restrictors

In some embodiments, a flow restrictor may include a flow limiting subassembly including for example a core and/or a cover. The flow restrictor optionally includes a fluid outlet coupler and/or a fluid outlet attachment and/or a fluid outlet chamber adapted for bonding to an outlet zone on an inside surface of a fluid conduit. Optionally the flow restrictor may be self contained and/or button type and/or may include a pressure compensating regulator. Features disclosed in some embodiments of the current invention facilitate the aligning and/or bonding of a button dripper to a wall of cylindrical conduit with minimal disturbance to the exterior shape and/or properties of the conduit. In some embodiments, the outlet zone may be suitable for perforation by automated machinery. For example the outlet zone may optionally range between 200 to 500% larger than perforation size. Drippers may be spaced between 100 and 1000 mm apart in a conduit. The outlet chamber may allow for 0.5-2.0% misalignment, which may be useful in automatic perforation. For example the outlet chamber may have a width ranging between 2 mm and 10 mm and/or the outlet chamber may have a width ranging between 3 mm and 7 mm. For example the chamber may occupy an angular extent of less than 20° on the circumference of the conduit. For example the installation of the emitter may change the width of the conduit by less than 5%. Perforation may include for example punching, slicing, cutting and or other technologies.

In some embodiments the dripper may be installed in a hose having an inner diameter of between 5 to 30 mm. For example the dripper may be installed in a hose having a wall thickness of between 0.1 to 4 mm, and more particularly in some embodiment the dripper may be installed into a thin walled hose having a wall thickness of between 0.1 to 1.0 mm. For example the hose with the drippers may have a working pressure range between 1 to 3 atm or alternatively for example ranging between 0.2 to 4 atm.

In some embodiments the output flow rate of a flow restrictor is regulated. For example, the emitter may preserve a substantially constant flow rate ranging between 0.2 to 8 l/hr. For example, it may preserve a constant flow rate of about 0.5, 1, 2, 3, 4, or 8 l/hr. For example, the emitter may preserve the specified output flow rate to ±10% under variations of input pressure ranging between for example 1 to 3 atm or alternatively for example ranging between 0.2 and 4 atm, for example due to changes of elevation along the conduit and/or transient pressure changes and/or changes in pressure along the conduit (due for example to head loss along the conduit). The emitter may optionally include a one way valve to prevent back flow.

In some embodiments an outlet chamber and/or the body of the flow restrictor may be produced in a single piece of molded plastic. Optionally a bonding surface between the outlet chamber and the inner wall of the conduit may perpendicular to an axis of the flow restrictor. Optionally, the outlet chamber and/or the bonding zone may be thinner that the flow restrictor. Optionally, the flow restrictor may be disk and/or cylindrical and/or conical in shape. Optionally the flow restrictor may include pressure compensation.

Chemically Active Materials

In some embodiments, an inlet attachment and/or outlet attachment of a flow restrictor may include a chemically active component. Optionally the chemically active component may include a slow release chemical. For example, the slow release chemical may include an herbicide and/or a plant growth inhibitor, for example Rootguard® registered to A. I. Innovations N.V. in San Rafael, Calif., 94901 and/or Treflan® and/or Balan® available from Dow AgroSciences, LLC 9330 Zionsville Road, Indianapolis, Ind. 46268. For example a slow release chemical may include a biocide and/or a fungicide and/or an inhibitor of biofilm producing organisms. For example a chemically active component may prevent calcification and/or mineral precipitation. For example slow release granules may be associated with and/or fixed to the attachment and/or the attachment may be coated with a slow release chemical and/or the material of attachment may be impregnated with the slow release chemical and/or chemicals may be encapsulated inside the material of the attachment and/or encapsulated materials may be fixed to the attachment.

In some embodiments, an inlet attachment and/or an outlet attachment for a flow restrictor may be made of a different material from the flow restrictor. For example the attachment may include a chemically active component and/or the attachment may be made of a less expensive material than the flow restrictor and/or the attachment may be made of a more expensive material than the flow restrictor and/or the attachment may be made to a different (higher and/or lower) machining precision than the flow restrictor.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Embodiments

Schematic Illustrations

FIG. 1 is a block diagram illustrating a flow restrictor with an inlet attachment in accordance with an embodiment of the present invention. In some embodiments, a flow restrictor 102 is attached to an inlet attachment 104. Optionally flow restrictor 102 is a complete flow restricting device capable of directing flow from an inlet 110 to an outlet chamber 106 and/or capable of limiting a flow rate from inlet 110 to outlet chamber 106 to within a predetermined defined volumetric flow rate over a predetermined range of head drops between inlet 110 and outlet chamber 106. For example, a flow restricting fluid pathway 108 may be a closed conduit connecting inlet 110 to outlet chamber 106. Optionally the closed conduit may be complete prior to connection to inlet attachment 104. Optionally, outlet chamber 106 has an open face suitable for sealing to an inner wall of a conduit. For example, flow restrictor 102 may be suitable for autonomous operation. Alternatively or additionally, flow restrictor 102 may be a modular part, suitable for attachment to one or more different inlet attachments.

In some embodiments, inlet attachment 104 includes a mount 116 for holding flow restrictor 102. Optionally mount 116 retains a fluid outlet 112 of inlet attachment 104 in fluid communication with inlet 110 of flow restrictor 102. Optionally inlet attachment 104 includes one or more inlet openings 114. For example, fluid may pass from a conduit into inlet openings 114 and be directed out outlet 112 to inlet 110 of flow restrictor 102. Optionally, mount 116 is configured to hold flow restrictor 102 with outlet chamber 106 exposed. For example, outlet chamber 106 of restrictor 102 may be exposed and/or attachable to a wall of a conduit while flow restrictor 102 is held in mount 116. Optionally, inlet attachment 104 is configured such that when flow restrictor 102 is mounted to mount 116 and outlet chamber 106 is attached to the inner wall of a conduit, inlet opening 114 is directed towards the inside and/or the axis of the conduit.

In some embodiments an inlet attachment may condition fluid before entering the flow restrictor. For example the inlet attachment may include a filter. The filter optionally removes particles from the inflowing fluid. Alternatively or additionally the inlet attachment may include a chemically active component. For example, an inlet attachment may include a slow release chemical, for example including an herbicide and/or root inhibitor and/or biocide.

Figure 2:
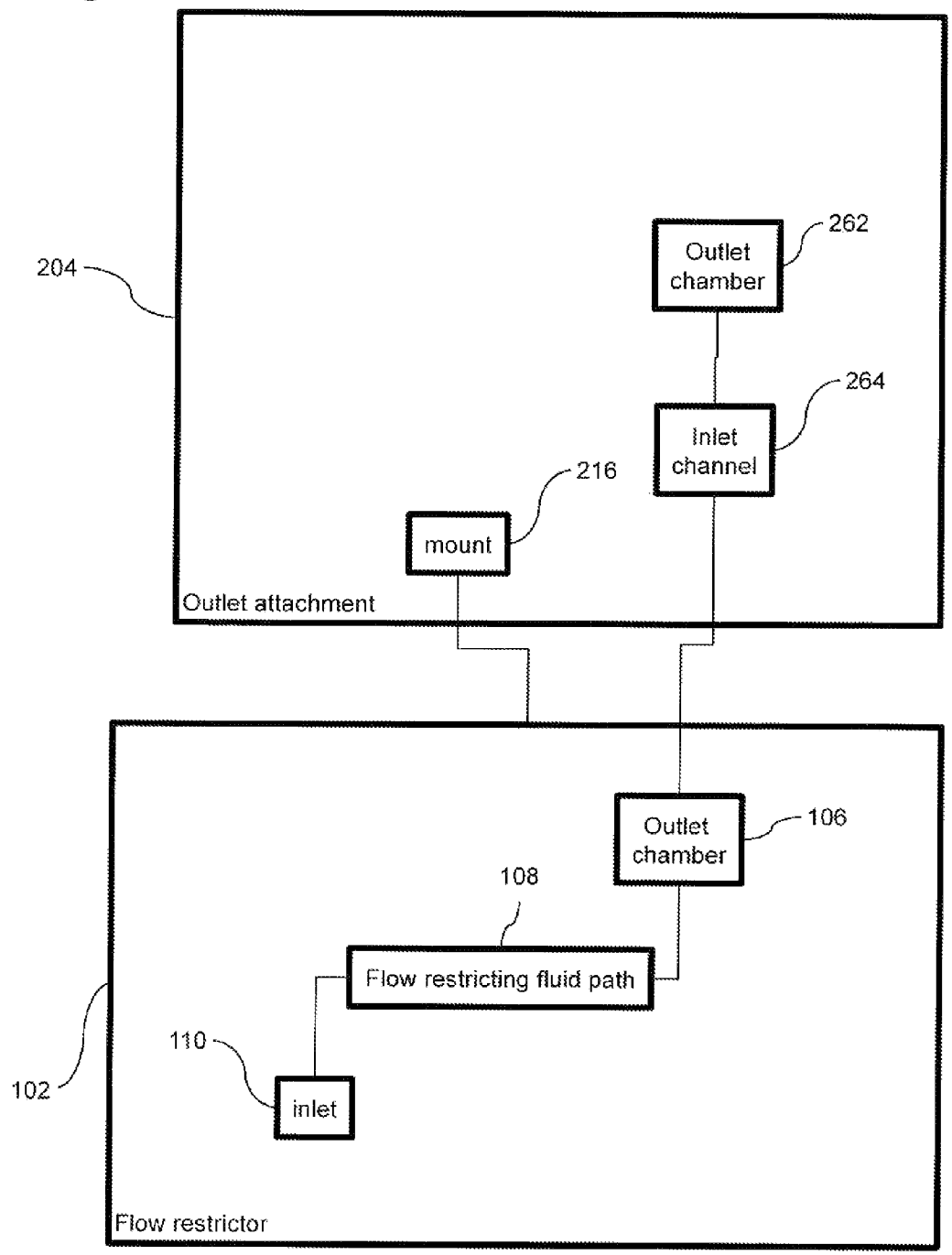
FIG. 2 is a block diagram illustrating a flow restrictor and an outlet attachment in accordance with an embodiment of the present invention.

FIG. 2 is a block diagram illustrating a flow restrictor 102 with an outlet attachment 204 in accordance with an embodiment of the present invention. In some embodiment fluid restrictor 102 may be attached to a mount 216 of outlet attachment 204. Optionally the same flow restrictor 102 may be suitable for use in a modular way with different inlet and/or outlet attachments. Optionally an outlet attachment may include a mount 216 that holds flow restrictor 102 with its outlet chamber 106 in fluid communication with an inlet duct 264 and/or an outlet chamber 262 of outlet attachment 204. For example, different outlet attachments of various geometries may be suitable to connect a modular flow restrictor to different conduits of different sizes, geometries and/or materials. For example, an attachment may include a sleeve for insertion into a hose.

In some embodiments an attachment for a flow restrictor may include one or both of an inlet attachment and/or an outlet attachment. Alternatively or additionally, an inlet and/or outlet attachment may include an adaptor to facilitate installation and/or use of a flow restrictor with machinery that is not suitable for installing or use with the flow regulator by itself. Optionally, an attachment for a flow restrictor may be made of the same material as the restrictor and/or of a different material and/or may include an additive (for example a slow release chemical). The material of the attachment may in some embodiments be more expensive than the material of the flow restrictor (for example with special properties (for example a slow release chemical) and/or less expensive (for example in order to make a large cheap filter for the regulator)).

Figure 3:
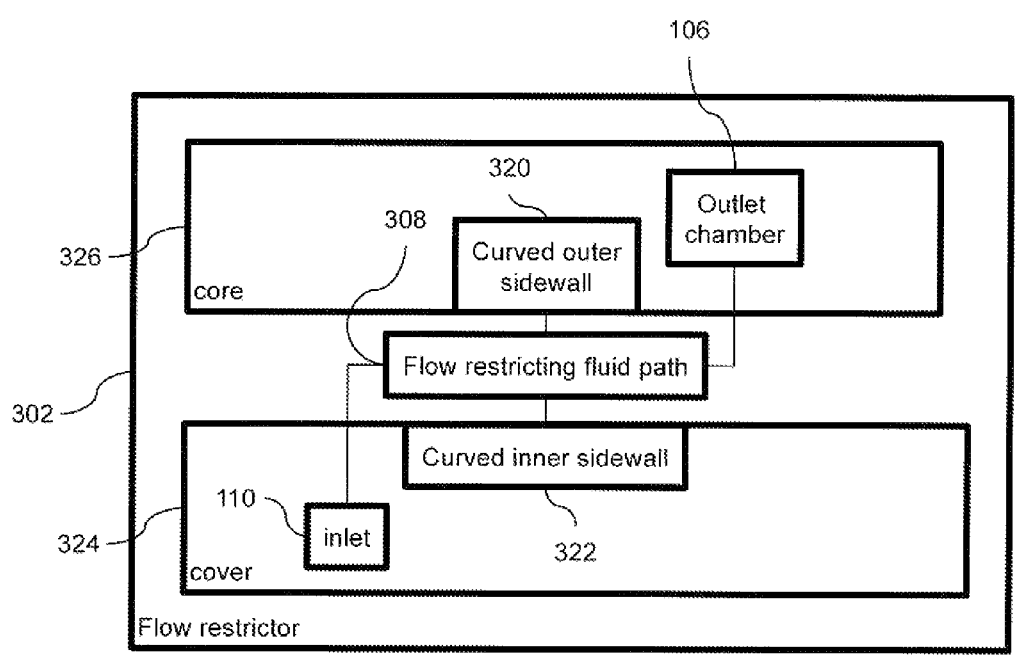
FIG. 3 is a block diagram illustrating a two part flow restrictor in accordance with an embodiment of the present invention.

FIG. 3 is a block diagram illustrating a two part flow restrictor in accordance with an embodiment of the present invention. In some embodiments flow restrictor 302 may include a cover 324 and/or a core 326. For example a flow restricting flow path 308 may be formed between a curved inner wall 322 of cover 324 and a curved outer wall 320 of core 326. Optionally two part fluid restrictor 302 may fit and/or be used with an inlet attachment (for example inlet attachment 104) and/or an outlet attachment (for example outlet attachment 204).

Optionally, flow restricting fluid path 308 may include a labyrinth flow path. For example, the labyrinth may be formed by baffles. Optionally some or all of the baffles may be formed on outer wall 320 and/or on inner wall 322.

Figure 4:
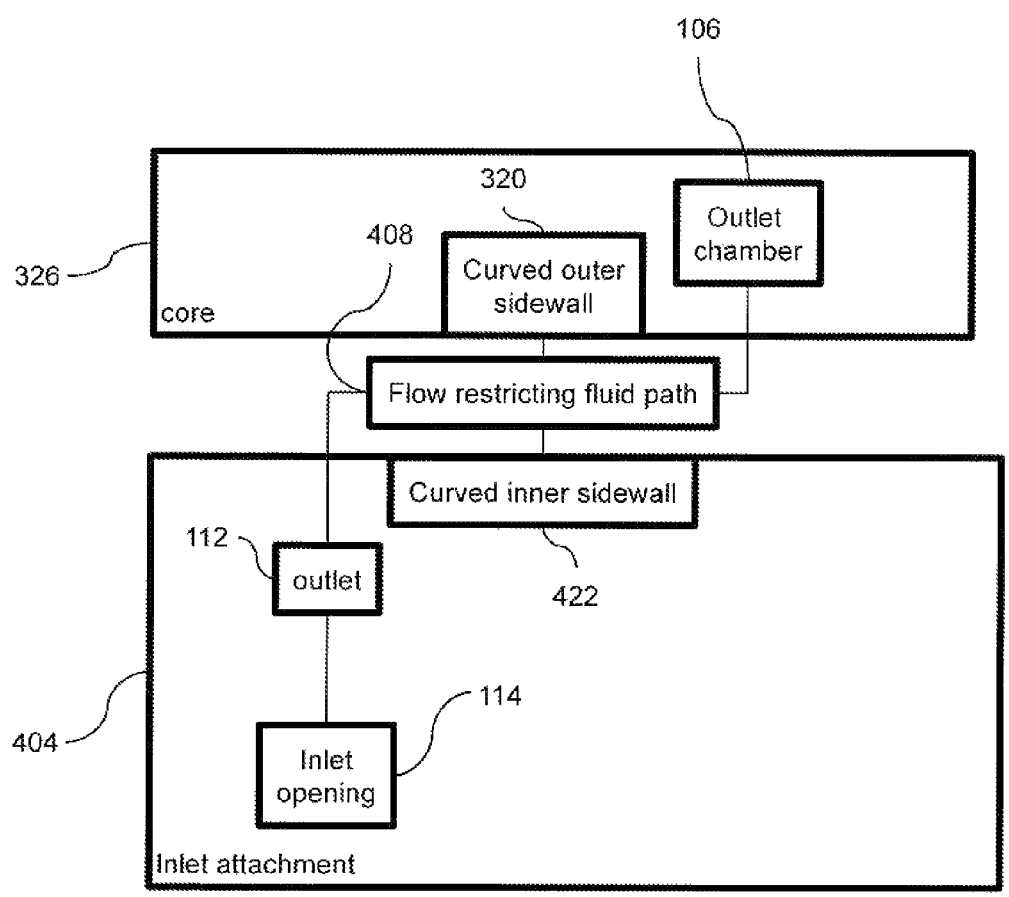
FIG. 4 is a block diagram illustrating a flow restrictor core and an inlet attachment in accordance with an embodiment of the present invention.

FIG. 4 is a block diagram illustrating a flow restrictor core with an inlet attachment in accordance with an embodiment of the present invention. In some embodiments, a fluid restrictor core 326 may be installed directly into an inlet and/or outlet attachment (for example inlet attachment 404). For example and an attachment may include a sleeve for insertion into an irrigation hose. For example the attachment may serve the function of cover 324. For example, a flow restricting fluid path 408 may be formed between an inner wall 422 of the attachment and an outer wall 420 of core 326. For example path 408 may supply fluid communication between an outlet 112 of the attachment and an outlet chamber 106 of core 426.

Round Button Flow Restrictor and Inlet Attachment

Figure 5C:
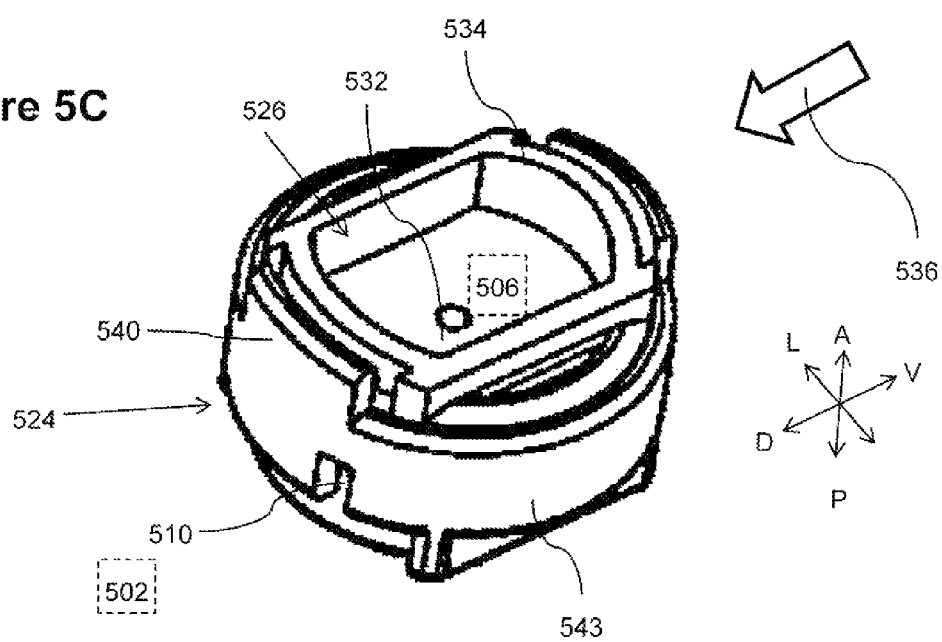
FIG. 5C is an anterior perspective view of a flow restrictor in accordance with an embodiment of the present invention.

FIG. 5A is an anterior perspective view of a flow restrictor 502 with an inlet attachment 504 in accordance with an embodiment of the present invention. Optionally flow restrictor 502 includes a complete two part flow restrictor including a core 526 and a cover 524. Optionally flow restrictor 502 is suitable for use autonomously, for example as an in-line drip emitter attached to an inner wall of a conduit. For example, restrictor 502 may include an inlet with filtering openings 513 suitable for receiving fluid from the conduit and/or an outlet chamber 506 suitable for attaching to an inside wall of the conduit over an outlet perforation. Optionally, flow restrictor 502 is suitable to attach to an inlet attachment 504. For example, attachment 504 includes an enlarged filtering area with inlet openings 514 in fluid communication via an outlet 512 with an inlet 510 (for example see FIG. 5C) in cover 524 of flow restrictor 502. For example, as illustrated in FIG. 5A, a mounting 560 grasps cover 524 of flow restrictor 502. Optionally, attaching restrictor 502 to mounting 560 aligns and/or orients a periphery 534 of outlet chamber 506 and a periphery 538 of inlet chambers 530 of inlet attachment 504 for simultaneously attaching to an inner wall of a conduit (for example as illustrated in FIGS. 5F and 5G) forming an in-line drip emitter assembly with enlarged filter and/or inlet openings 513 and/or inlet opening 514 and/or inlet chambers 530.

In some embodiments the bonding surface (for example periphery 534 and/or periphery 538) is optionally flat. In some embodiments, bonding a flat bonding surface, to the conduit wall may distort the conduit. In some embodiments distortion may change the shape of the conduit, for example the diameter, less than 5%. An outlet perforation zone may occupy an angular ranging for example between 20° to 90° or less of the circumference of the conduit. In some embodiments a cover of the emitter and or an attachment may be bonded to the conduit wall. Alternatively or additionally, the cover and/or the attachment may not be bonded to conduit wall.

In some embodiments inlet 510 may be closed during autonomous operation. For example during manufacturing inlet 510 may be closed and/or attachment 504 may have an optional opening part that breaks open inlet 510 when cover 524 is mounted to mounting 560. Alternatively or additionally, inlet 510 may include one or more openings small enough to act as a filter.

In some embodiments flow restrictor 502 may be a regulated button dripper. For example inlets 510 and/or inlet openings 513 may lead via a flow restricting fluid path 508 to a regulating chamber 556 (for example see FIGS. 5F and 5G). Regulating chamber 556 is optionally in fluid communication with outlet chamber 506 via a port 532.

For convenience defining orientation, an exemplary set of axis are illustrated. The directions used herein include anterior A towards the outlet chamber of the flow restrictor (for example outlet chamber 506 of flow restrictor 502), posterior P away from the outlet chamber of the flow restrictor, ventral V facing the mean direction of flow in the conduit (illustrated by arrow 536), dorsal D opposite ventral V, and lateral L orthogonal to the other two axes.

In the exemplary embodiment of FIGS. 5A-G, the flow restrictor 502 and attachment 504 are configured for attachment to the inner wall of a conduit over less than half the inner circumference thereof. Other forms of drip emitters may include a modular flow restrictor and/or inlet attachment. For example an inlet attachment may have the form of a cylindrical sleeve that is inserted into a conduit and/or contacts the inner wall of the conduit on opposing sides thereof and/or around a circumference thereof.

In the exemplary embodiment of FIGS. 5A-G, flow restrictor 502 is a round regulated button restrictor. Optionally, other form of flow restrictors may be attached to an inlet attachment. For example, a simple non-regulated restrictor may be used. Alternatively or additionally a different shaped flow restrictor may be used. For example, an elliptical cross section flow restrictor may be mounted to an inlet attachment. Flow restrictor 502 is a two part flow restrictor. Alternatively or additional a flow restrictor with more or less parts may be mounted to an inlet attachment.

FIG. 5B is a posterior perspective view of flow restrictor 502 mounted to inlet attachment 504 in accordance with an embodiment of the present invention. Optionally, inlet attachment 504 does not cover some of the inlet openings 513. For example, flow into restrictor 502 may be through inlet openings 514 and/or inlet 510 and/or directly from the conduit through inlet openings 513.

In some embodiment mounting 560 grasps flow restrictor 502 from opposing sides thereof. For example, in the example of FIGS. 5A-G, mounting 560 grasps restrictor 502 from the dorsal and ventral sides thereof. Optionally, mounting 560 also keeps outlet 512 of attachment 504 aligned and/or in fluid communication with inlet 510 of flow restrictor 502. Optionally, the mount engages restrictor 502 by means of snaps, interference elements, friction, compression (for example between two opposing surface), welding and/or glue. Engaging may include holding inlet attachment 504 to flow restrictor 502. In some embodiments, periphery 534 and/or periphery 538 may be bonded to the inner wall of a conduit. Optionally the connection to the conduit holds the assembly together.

In the exemplary embodiment of FIGS. 5A-G, the long axis (running from the dorsal to ventral ends) of inlet attachment 504 is optionally aligned with the mean flow direction in the conduit. Optionally the lateral width of inlet attachment 504 and the height (from the anterior to posterior ends) are approximately the same as the width and height of flow restrictor 502. For example the resistance to the mean flow in the conduit of the entire assembly (flow restrictor 502 and attachment 504) together may be approximately the same as the flow resistance of flow resistor 502 by itself.

FIG. 5C is an anterior perspective view of a flow restrictor in accordance with an embodiment of the present invention. In some embodiments, snaps and/or interference elements may hold cover 524 together with core 526. For example, snap arm extensions 540 on cover 524 snap onto a ledge 541 on core 526.

Figure 5D:
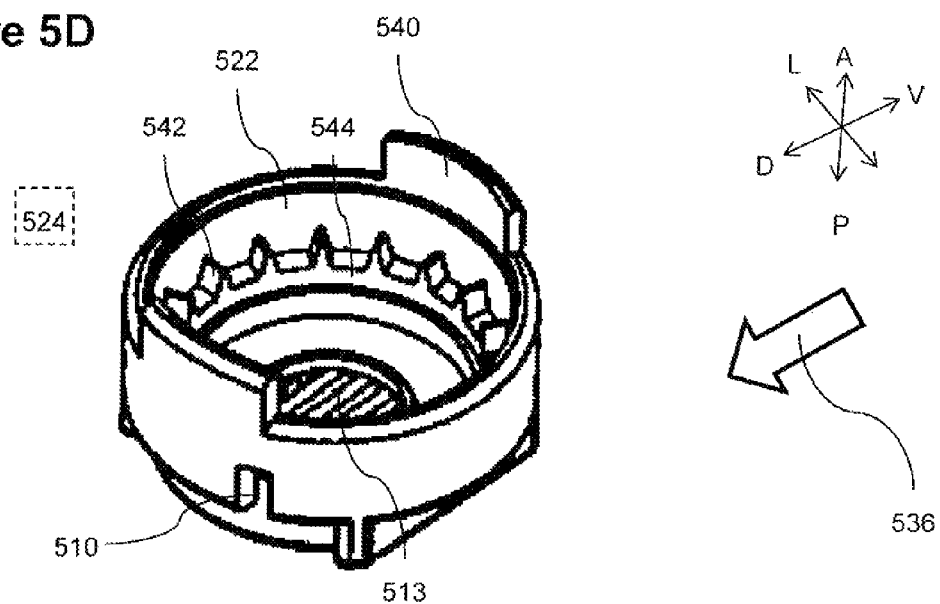
FIG. 5D is an anterior perspective view of a flow restrictor cover in accordance with an embodiment of the present invention.
Figure 5E:
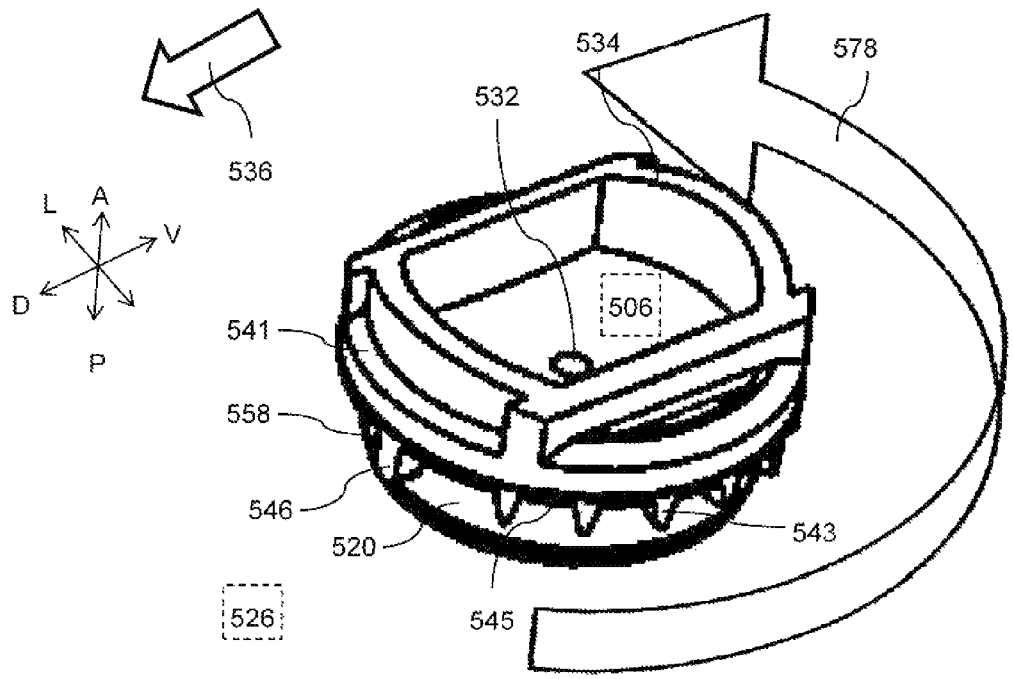
FIG. 5E is an anterior perspective view of a flow restrictor core in accordance with an embodiment of the present invention.
Figure 5F:
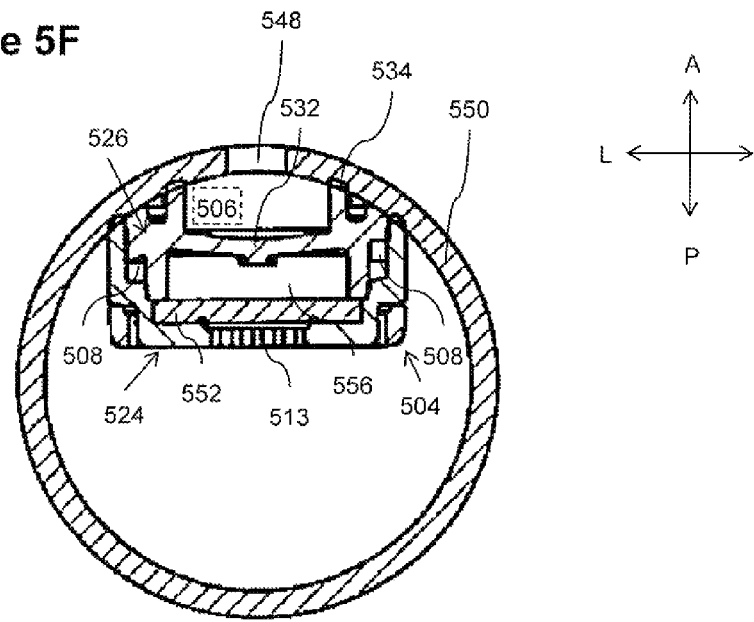
FIG. 5F is a cross section view of a flow restrictor with an input attachment installed in a conduit in accordance with an embodiment of the present invention.
Figure 5G:
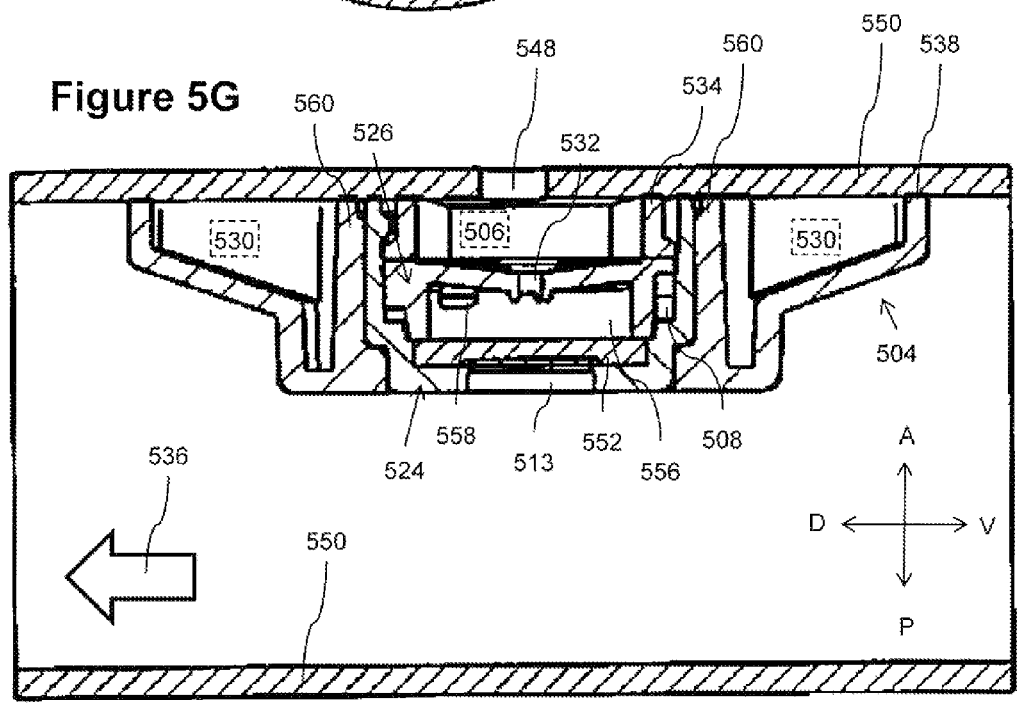
FIG. 5G is a longitudinal cross section view of a flow restrictor with an input attachment installed in a conduit in accordance with an embodiment of the present invention.

FIGS. 5D and 5E are anterior perspective views of a flow restrictor cover and core respectively in accordance with an embodiment of the present invention. In some embodiments, a flow restricting fluid pathway 508 (for example as illustrated on FIG. 5F) circles and/or revolves around all and/or part of a flow restrictor. For example, as is illustrated, for example, by arrow 578 in FIG. 5E, path 508 optionally runs from fluid inlet 510 between inner curved wall 522 of cover 524 and outer curved wall 520 of core 526 to opening 558. Flow optionally passes through opening 558 to regulating chamber 556. Path 508 is optionally bounded on the posterior side by a sealing ring 544 of cover 524. Path 508 is optionally bounded on the anterior side by a sealing ring 545 of core 526. For example sealing ring 544 may seal against outer curved wall 520 and/or sealing ring 545 may seal against inner curved wall 522. Optionally a divider 546 separates and/or prevents short circuit flow between flow inlet 510 and opening 558.

Flow resistance on path 508 is optionally provided by cooperating baffles. Optionally the baffles may intermesh. For example, when cover 524 is connected to core 526, baffles 542 protruding in an anterior direction from sealing ring 544 on cover 524 may intermesh (protrude between) baffles 543 protruding in an posterior direction from sealing ring 545 on core 526. The various features on cover 524 and/or core 526 may be designed for easy molding. For example, in the embodiment of FIGS. 5A-G, core 526 and cover 524 are designed to allow molding with a two part mold and/or an injection mold where the mold and the molded parts are separated by longitudinal motion.

FIGS. 5F and 5G are ventral and lateral cross section views respectively of a flow restrictor with an input attachment installed in a conduit in accordance with an embodiment of the present invention. In some embodiments, the faces of inlet chamber 530 and/or outlet 506 are closed by sealing periphery 538 and/or periphery 534 against an inner wall 550 of the fluid conduit. In some embodiments, the assembly (flow restrictor 502 and/or attachment 504) is configured to reduce drag on flow in the conduit. For example, the long axis of the assembly is optionally oriented parallel to the mean flow in the conduit. For example, the assembly may be attached to inner wall of the conduit over less than half a circumference thereof.

In some embodiments inlet opening 513 provides fluid communication between a conduit and the inside of flow restrictor 502. For example, fluid pressure in the conduit may deform a flexible membrane 552 to bulge into regulating chamber 556. In some embodiments, fluid may flow through openings 513 into a duct (for example duct 1011 as illustrated in FIG. 10F) providing fluid communication between openings 513 and/or inlet 510 and/or the beginning of flow path 508. Inflowing fluid optionally circles along path 508 around regulating chamber 556 and/or outlet chamber 506. The fluid optionally exits path 508 at reduced pressure through opening 558 into regulating chamber 556. Fluid optionally exits regulating chamber through port 532 to outlet chamber 506. Fluid in outlet chamber 506 optionally exits the conduit through a perforation 548 in the conduit wall 550. In some embodiments, high pressure differential between outlet chamber 506 and inlet openings 513 and/or inlet 510 causes membrane 552 to bulge towards port 532 increasing the flow resistance in regulating chamber 556. Optionally increased flow resistance under high pressure differentials reduces flow under high pressure differentials and/or regulates flow.

Variations on an Inlet Attachment and Restrictor

FIG. 6A is a posterior perspective view of flow restrictor 502 with a complete inlet attachment 604a in accordance with an embodiment of the present invention. Optionally when flow restrictor 502 is mounted to attachment 604a, all and/or approximately all fluid entering flow restrictor 602 passes through filtering openings 614a in attachment 604a. Fluid entering openings 614a in attachment 604a may optionally flow into restrictor 502 through openings 513 and/or inlet 510.

FIG. 6B is a posterior perspective view of flow restrictor 502 with a semi-complete inlet attachment 604b in accordance with an embodiment of the present invention. Optionally when flow restrictor 502 is mounted to attachment 604b, some fluid may enter flow restrictor 502 through inlet attachment 604b and/or some fluid may enter flow restrictor 502 directly from the fluid conduit through openings 513. Fluid entering openings 614b in attachment 604b may optionally flow into restrictor 502 through openings 513 and/or inlet 510.

Figure 6C:
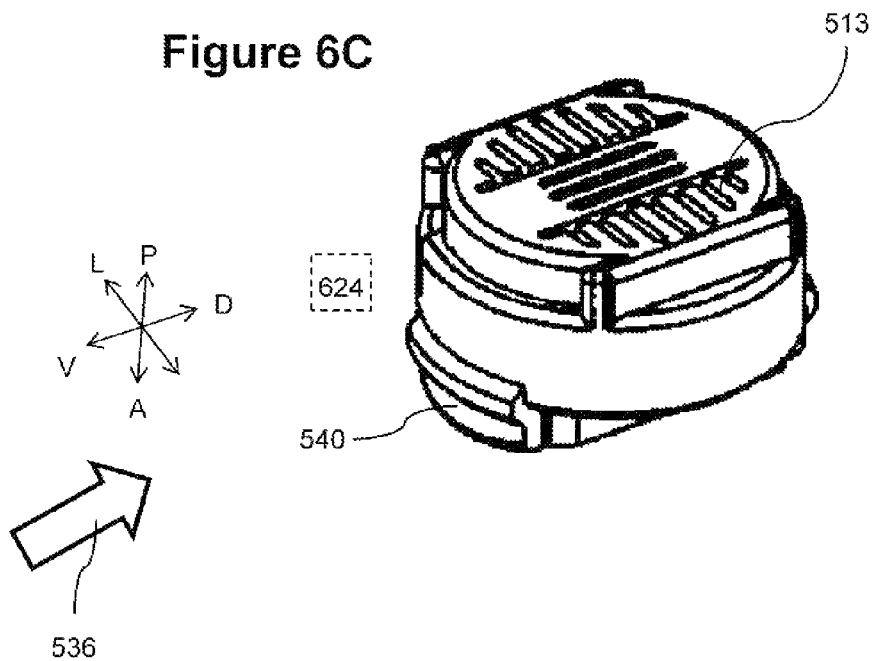
FIG. 6C is a posterior perspective view of a flow restrictor without an attachment inlet in accordance with an embodiment of the present invention.
Figure 6D:
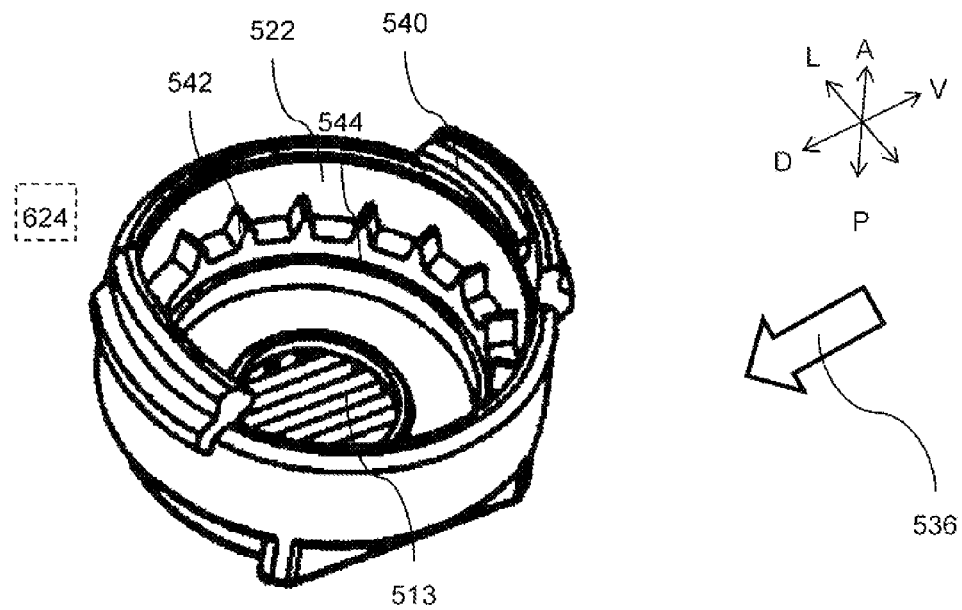
FIG. 6D is an anterior perspective view of a flow restrictor cover without an attachment inlet in accordance with an embodiment of the present invention.

FIGS. 6C and 6D are posterior and anterior perspective views respectively of a flow restrictor cover 624 without an attachment inlet 510 in accordance with an embodiment of the present invention. Cover 624 may optionally include a duct (for example see duct 1011 of FIG. 10F) supplying fluid communication between inlet openings 513 and the beginning of flow restricting fluid path 508. Optionally cover 624 and core 524 may be connected to form an autonomous in-line drip emitter and/or cover 624 and core 524 may be connected to inlet attachment 604a and/or attachment 604b such that all and/or some of fluid entering the flow restrictor passes through openings 614a and/or openings 614b.

Figure 7A:
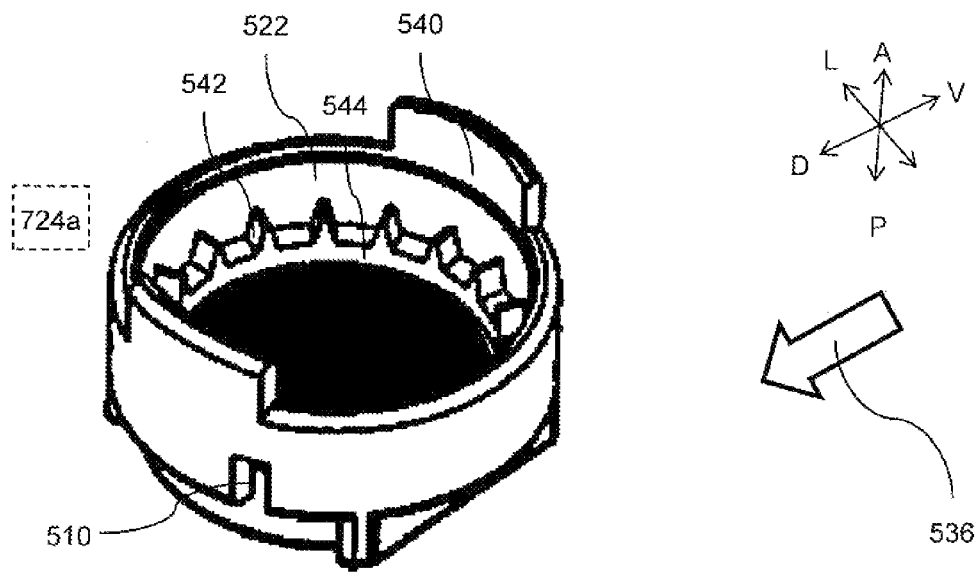
FIGS. 7A and 7B illustrate anterior perspective views of a flow restrictors cover without an inlet filter in accordance with an embodiment of the present invention.
Figure 7B:
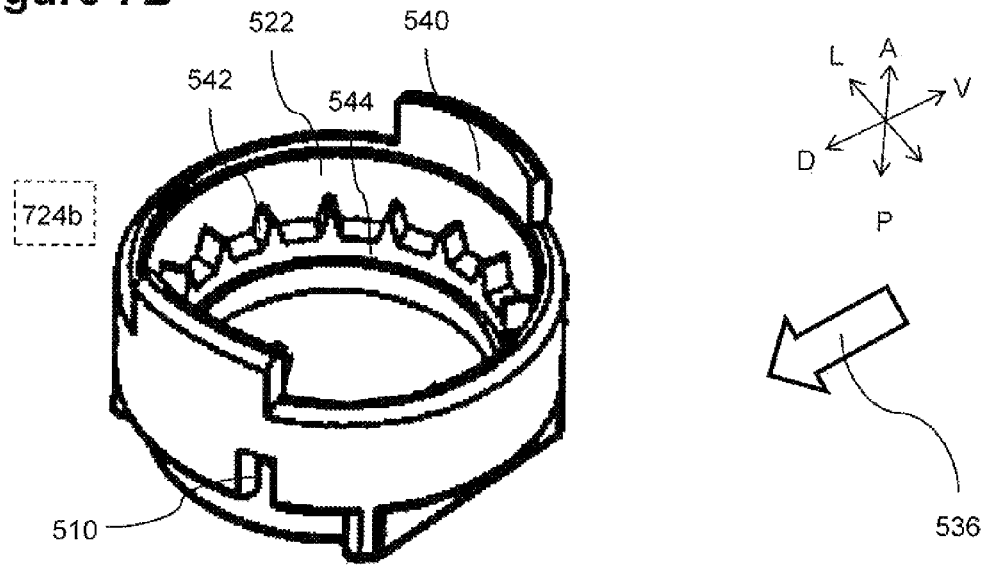

FIGS. 7A and 7B illustrate posterior perspective views of flow restrictors cover 724a and cover 724b in accordance with an embodiment of the present invention. The posterior side of cover 724a is optionally open. For example, cover 742a may be used with inlet attachment 604a. The posterior side of cover 724b is optionally substantially sealed. For example, all fluid entering cover 724b may be through attachment inlet 510. Additionally or alternatively, for a flow restrictor using cover 724b and core 526, fluid pressure on flexible membrane 552 may pass through inlet 510 and the duct connecting fluid inlet 510 to the inner side of the posterior wall of cover 724b (for example the duct may be the same size, shape and position as duct 1011 of FIG. 10F). A flow restrictor using cover 724b could be used for example with attachment 504, attachment 604a and/or attachment 604b. Cover 724b could optionally be used with attachment 504 to produce an assembly with a low profile (not needing extra material of the attachment of the posterior side of the flow restrictor) where essentially all fluid entering the flow restrictor comes through inlet openings 514 and/or inlet chambers 530 and/or outlet 512 of attachment 504.

Outlet Attachment Sleeve for Restrictor Core

Figure 8A:
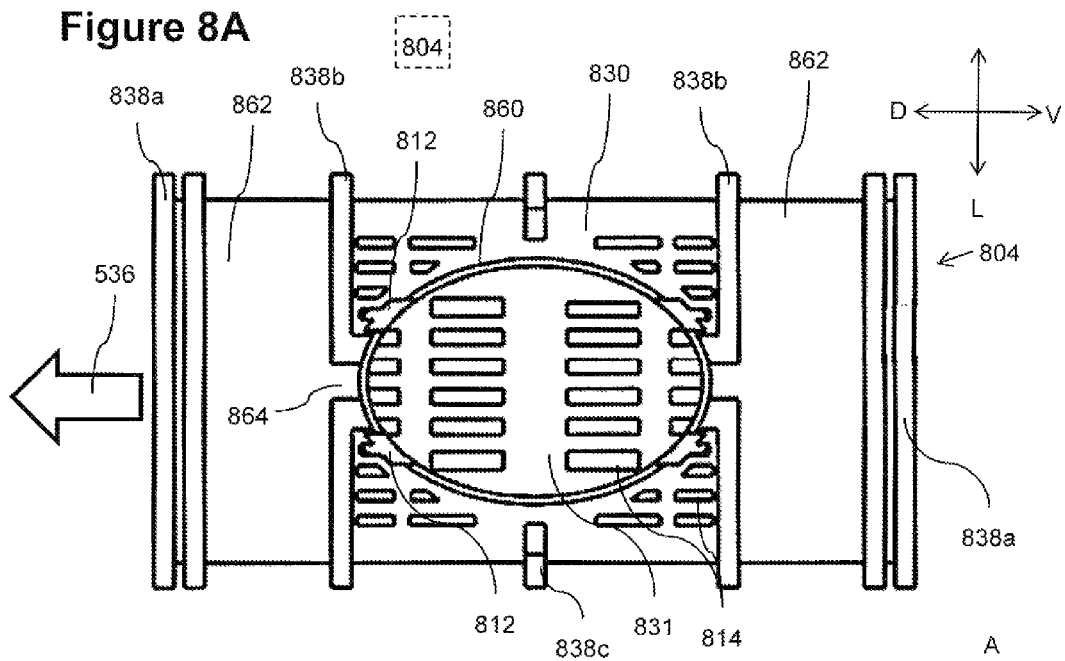
FIG. 8A is a view of a cylindrical hose insert with a mount for a flow restrictor core in accordance with an embodiment of the present invention.

FIG. 8A is a view of a cylindrical hose insert sleeve 804 with a mount 860 for a flow restrictor in accordance with an embodiment of the present invention. In some embodiments, sleeve 804 includes an open faced annular inlet chamber 830. Optionally, when a flow restrictor is mounted into mounting 860, fluid communication is provided from an inlet chamber 830 to an inlet of the flow restrictor (for example inlet duct 811 as illustrated in FIG. 8C and/or inlet 910 as illustrated in FIGS. 9B, 9E and/or 9F) via outlet ducts 812. Alternatively or additionally, duct 811 may provide fluid communication between a posterior inlet chamber 831 of mount 860 and fluid path 808 and/or ducts 812. For example, a flexible membrane may divide posterior inlet chamber 831 from a regulating chamber of the flow resistor. Alternatively or additionally, posterior input chamber 831 may be in fluid communication with a posterior inlet opening of a cover of the flow resistor (for example inlet openings 913 of resistor 902 of FIG. 9B). Optionally, sleeve 804 includes one or two open faced annular outlet chambers 862. For example annular outlet chambers 862 may be located on a longitudinal extension of sleeve 804. Fluid communication between outlet chambers 862 of sleeve 804 and an outlet chamber of the flow resistor is optionally by means of one or more fluid passageways (for example passageway 864 in mounting 860 and/or passageway 866 in walls of outlet chamber 806 of the flow restrictor for example as illustrated in FIG. 8B).

In some embodiments, inlet chamber 830 and outlet chamber 862 may entirely surround sleeve 804. Alternatively or additionally, inlet chamber 830 and outlet chamber 862 may only partially surround sleeve 804. In the case (for example where outlet chamber 862 entirely surrounds sleeve 804) the connection between outlet chamber 862 and an outlet opening of the conduit (for example perforation 548 of FIG. 5F and/or 5G) may be independent of the angular orientation of sleeve 804 around its longitudinal axis. Optionally, a drip irrigation hose could be produced without requiring control of the angular orientation of openings 548 and/or sleeve inserts 804. Optionally, for a sleeve 804 with outlet chambers 862 on both ends (for example as illustrated in FIGS. 8A and 8B) fitting the emitter to an outlet opening of the hose may be independent of the longitudinal direction of sleeve 804. For example, a drip irrigation hose may be produced without having to control the longitudinal orientation of the sleeve inserts 804 (for example the ventral-dorsal orientation of insert 804).

In some embodiments, fluid may enter fluid inlet chamber 830 and/or posterior inlet chamber 831 through inlet openings 814.

Figure 8B:
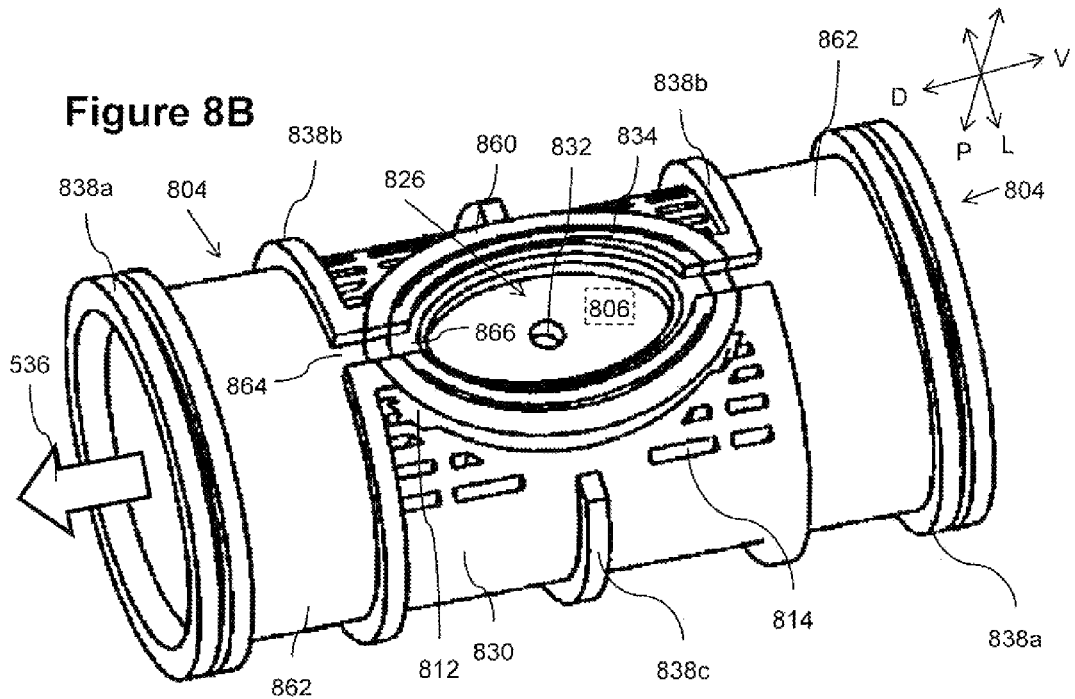
FIG. 8B is a perspective view of a cylindrical hose insert with a mount and a flow restrictor core in accordance with an embodiment of the present invention.
Figure 8C:
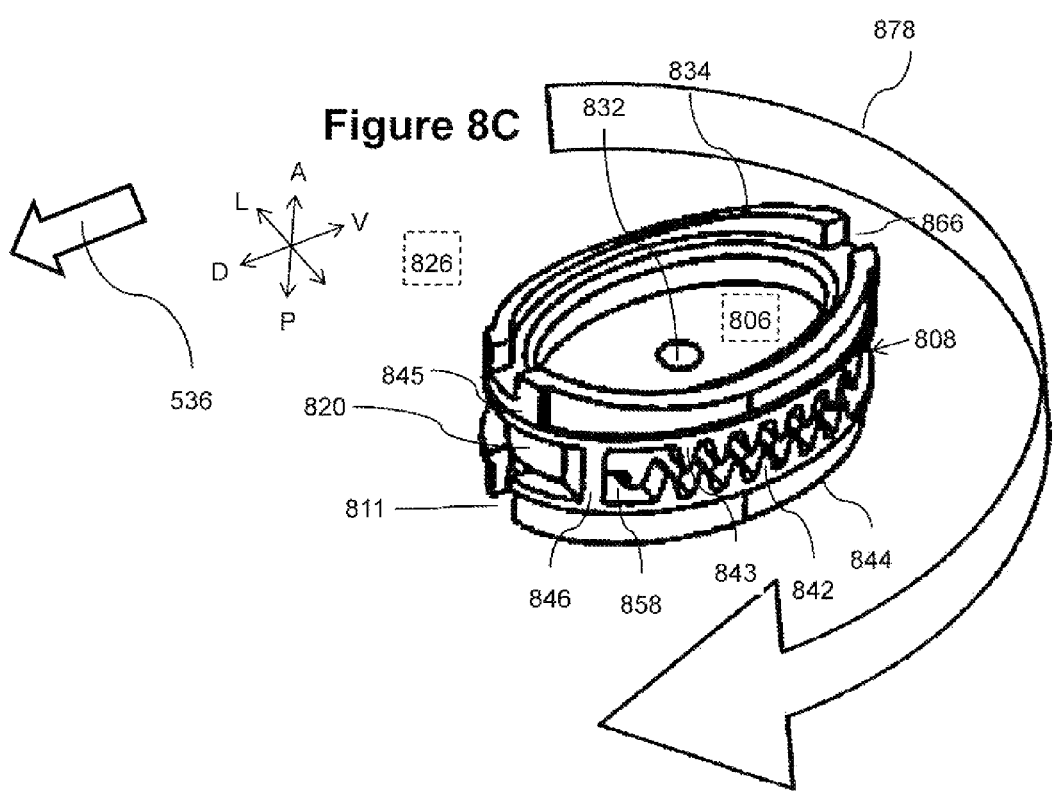
FIG. 8C is a perspective view of an elliptical flow restrictor core in accordance with an embodiment of the present invention.

FIG. 8B is a perspective view of a cylindrical hose insert with a mount and a flow restrictor core in accordance with an embodiment of the present invention. In some embodiments, the inner surface of mounting 860 may form an outer wall of flow resistant fluid path 808. For example, a flow resistor core 826 may be mounted directly into mounting 860 without a separate cover.

In some embodiments, flow resistor core 826 may have an elliptical cross section. Optionally, the long axis of the ellipse may be mounted parallel to the mean flow direction in the conduit (for example parallel to the longitudinal axis of sleeve 804). Alternatively or additionally the flow restrictor may have a different shape. For example the flow restrictor may have a circular cross section (for example similar to resistor 502). Alternatively or additionally the flow resistor may have a hydrodynamic shape, for example an egg shape. For example an egg shaped flow resistor may have the large end facing the flow (oriented in the ventral direction).

In some embodiments sleeve 804 may include ribs. For example, ribs may protrude radically from the sleeve. Optionally ribs may contact and/or be bonded to the inner walls of a conduit. For example ribs 838a and 838b may define outlet chamber 862 and/or inlet chamber 830. Ribs 838c may help prevent the wall of the conduit from collapsing into inlet chamber 830. Optionally, a rib may completely surround sleeve 804 (for example ribs 838a completely surround sleeve 802). Alternatively or additional a rib may partially surround the sleeve (for example ribs 838b and rib 838c only partially surround sleeve 802). Alternatively or additionally a rib may be continuous and/or discontinuous.

FIG. 8C is a perspective view of an elliptical flow restrictor core in accordance with an embodiment of the present invention. In some embodiments, a flow restricting fluid pathway 808 circles around all and/or part of a flow restrictor. For example, flow restricting fluid path 808 passes along the inner surface of mounting 860. As is illustrated, for example, by arrow 878, path 808 optionally runs from fluid inlet duct 811 between inner curved surface of mounting 860 and outer curved wall 820 of core 826 to opening 858 to a regulating chamber (for example chamber 956 as illustrated in FIG. 9D). Path 808 is optionally bounded on the posterior side by a sealing ring 844 of core 826. Path 808 is optionally bounded on the anterior side by a sealing ring 845 of core 826. For example sealing ring 844 and/or sealing ring 845 may seal against an inner curved surface of mounting 860. Optionally water a divider 846 separates and/or prevents short circuit flow between flow inlet duct 811 and opening 858.

Resistance on path 808 is optionally provided by cooperating baffles. For example baffles may be intermeshed (for example anterior directed baffles 842 protruding between posterior directed baffles 843) and/or the ends of baffle may line up (for example as illustrated in FIG. 11C). For example, baffles 842 protruding in an anterior direction from sealing ring 844 and baffles 843 protruding in a posterior direction from sealing ring 845. The various features on core 826 may be designed for easy molding. For example, in the embodiment of FIG. 8C, core 826 is designed to allow molding with a two part mold (for example a slip mold) and/or an injection mold where the mold and the molded parts are separated lateral motion. For example the baffles 842 and/or baffle 843 may be formed on one or both lateral surfaces of core 826. For example mold removal may be facilitate by orienting the angle of divider 846 and/or opening 858 and/or the walls of the baffles 842 and/or baffle 843 to are nearly parallel and/or pointing towards the lateral movement of the mold. The elliptical shape of core 826 optionally supplies extra length along the lateral sides of core 826 for the baffles of flow path 808. Optionally details do not protrude ventrally or dorsally in a way which would be difficult to mold with a laterally moving slip mold. In some embodiments it may be more difficult to seal an elliptical flow resistor than sealing a round flow resistor. Optionally molding baffles 842 and/or baffles 843 and/or ring 844 and/or ring 845 on core 826 may make it easier seal mounting 860 and/or cover 924 over elliptical core 826 than having sets of intermeshing baffles on the core and cover. Alternatively or additionally, an elliptical core may have a set of baffles that intermeshes with baffles on a mounting and/or cover.

Outlet Attachment Sleeve for Complete Restrictor

Figure 9A:
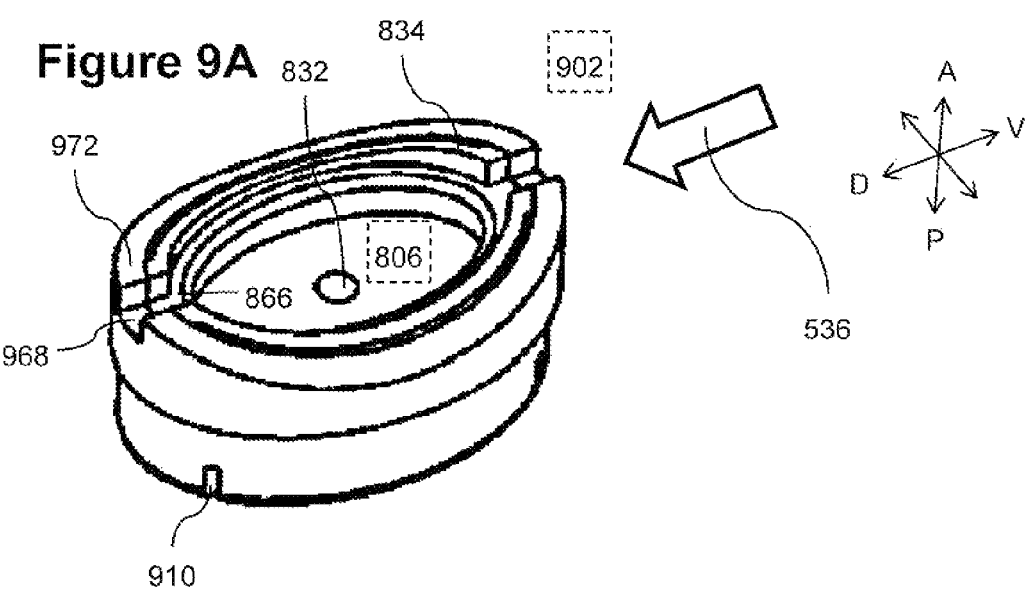
FIG. 9A is a perspective view of an elliptical flow restrictor in accordance with an embodiment of the present invention.
Figure 9B:
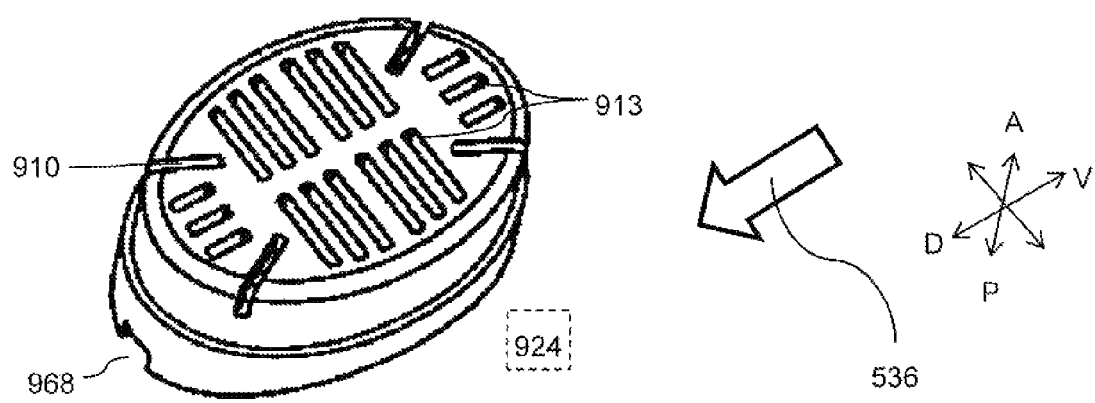
FIG. 9B is a perspective view of an elliptical flow restrictor cover in accordance with an embodiment of the present invention.
Figure 9C:
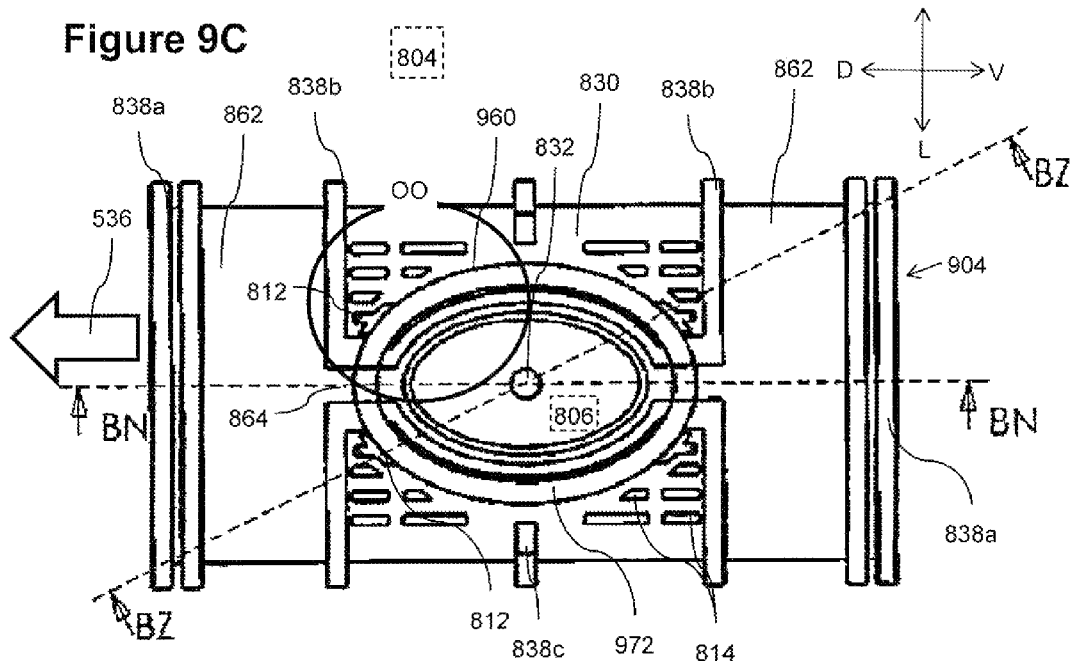
FIG. 9C is an anterior view of a cylindrical hose insert with a mount and a flow restrictor in accordance with an embodiment of the present invention.
Figure 9D:
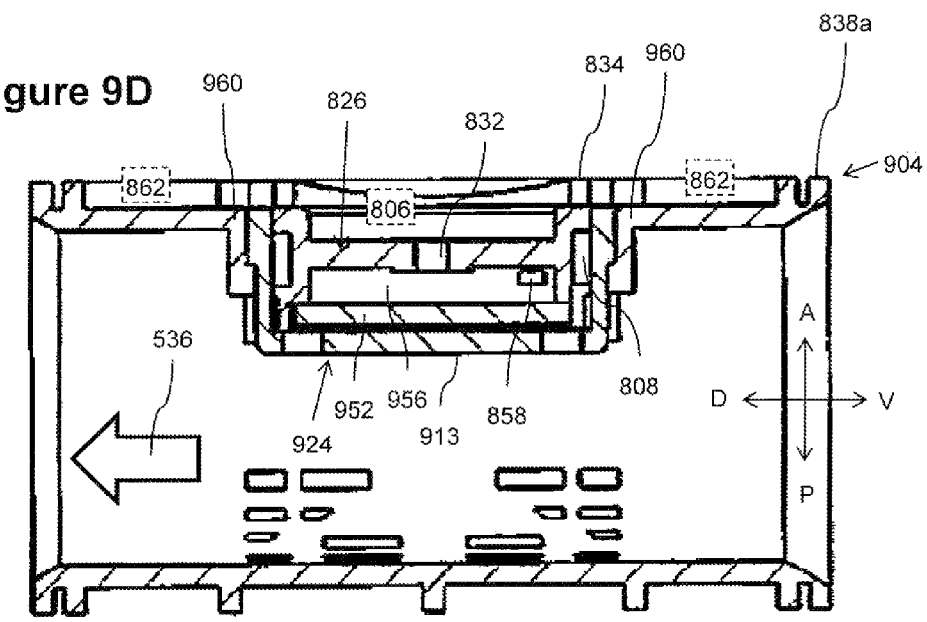
FIG. 9D is a longitudinal cross-sectional view of a cylindrical hose insert with a mount and a flow restrictor in accordance with an embodiment of the present invention.

FIGS. 9A, 9B and 9C are perspective anterior and posterior views of an elliptical flow restrictor and an anterior view of an elliptical flow restrictor mounted in a conduit insert sleeve 904 respectively in accordance with an embodiment of the present invention. In some embodiments, a mount (for example mount 960 of FIG. 9C) may be configured to hold a complete flow restrictor (for example including a core 826 and a cover 924). For example, flow restricting fluid path 808 may pass along the inner surface of a cover (for example the inner wall of cover 924). As is illustrated, for example, by arrow 878, path 808 optionally runs from fluid inlet duct 811 between inner curved surface of cover 924 and outer curved wall 820 of core 826 to opening 858 to regulating chamber (for example chamber 956 as illustrated in FIG. 9D). Path 808 is optionally bounded on the posterior side by a sealing ring 844 of core 826. Path 808 is optionally bounded on the anterior side by a sealing ring 845 of core 826. For example sealing ring 844 and/or sealing ring 845 may seal against an inner curved surface of cover 924. Optionally water a divider 846 separates and/or prevents short circuit flow between flow inlet duct 811 and opening 858.

FIG. 9D is a longitudinal cross-sectional (cut along line BN of FIG. 9C) view of cylindrical hose insert sleeve 904 with a mount and a flow restrictor in accordance with an embodiment of the present invention. Optionally, when restrictor 902 is mounted to mounting 960 (and/or when core 826 is mounted to mounting 860) a periphery 834 of outlet channel 806 is aligned and/or co-oriented with ribs 838a and/or ribs 838b and/or ribs 838c and/or a periphery 972 of mounting 860 and or mounting 960 such that they all contact the inner side of the conduit closing the face of outlet chamber 806 and/or inlet chamber 830 and/or outlet chamber 862.

FIGS. 9E and 9F are large scale and close up (of section OO FIG. 9C) oblique cross-section (along line BZ) views of a cylindrical hose insert with a mount and a flow restrictor in accordance with an embodiment of the present invention. In some embodiments inlet opening 913 and/or inlet 910 provide fluid communication between a conduit and the inside of flow restrictor 902. For example, fluid pressure in the conduit may deform a flexible membrane 952 to bulge into regulating chamber 956. In some embodiments, fluid may flow through openings 913 to the posterior side of membrane 952 and/or through duct 811 into the beginning of fluid path 808. Alternatively or additionally, fluid may flow through openings 814 into inlet chamber 830 and/or through duct 811 to the posterior side of membrane 952 and/or the beginning of fluid path 808. Inflowing fluid optionally circles along path 808 around regulating chamber 856 and/or outlet chamber 806. The fluid optionally exits path 808 at reduced pressure through opening 858 into regulating chamber 856. Fluid optionally exits regulating chamber through port 832 to outlet chamber 806. Fluid in outlet chamber 806 optionally exits to outlet chamber 862 through passageways 864 in mounting 860 and/or passageway 866 in core 826 and/or passageway 968 in cover 924. Fluid in outlet chamber 862 optionally exits the conduit through a perforation in the conduit wall. In some embodiments, high pressure differential between outlet chamber 806 and inlet openings 813 and/or inlet duct 811 causes membrane 852 to bulge towards port 832 increasing the flow resistance in the regulating chamber. Optionally increased flow resistance under high pressure differentials regulates flow.

Figure 10A:
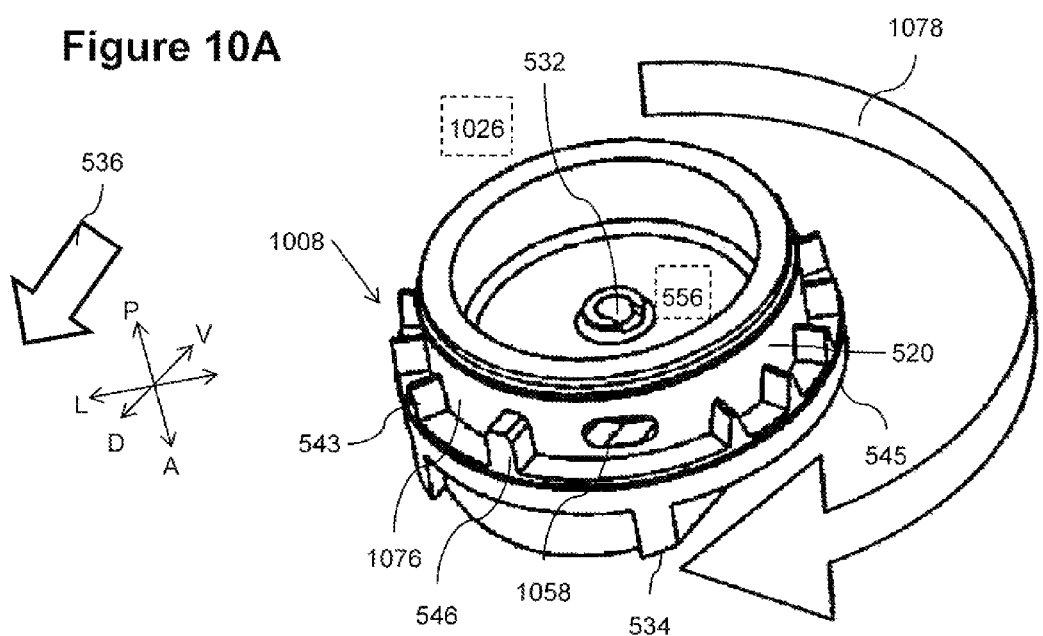
FIG. 10A is a posterior perspective view of a round flow restrictor core in accordance with an embodiment of the present invention.

FIG. 10A is a posterior perspective view of a round flow restrictor core 1026 in accordance with an embodiment of the present invention. Arrow 1078 illustrated how flow in flow resisting fluid path 1008 enters at a beginning 1076 circles and/or revolves around regulating chamber 556 and through opening 1058 into regulating chamber 556.

Figure 10B:
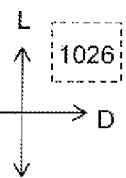
FIGS. 10B-D are orthogonal views of a round flow restrictor core in accordance with an embodiment of the present invention.
Figure 10C:
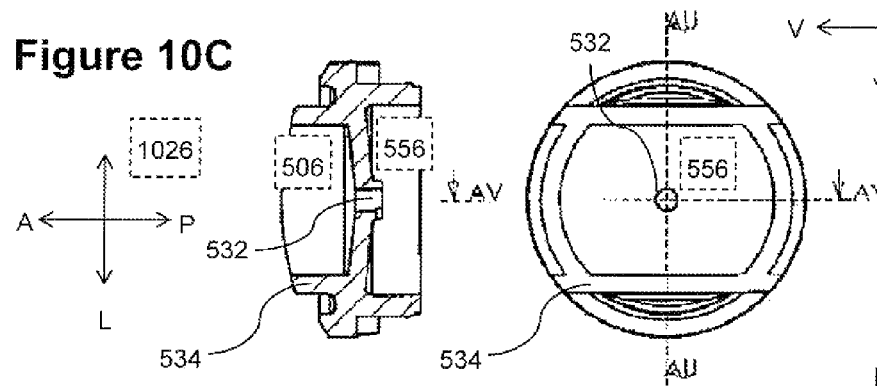
Figure 10D:
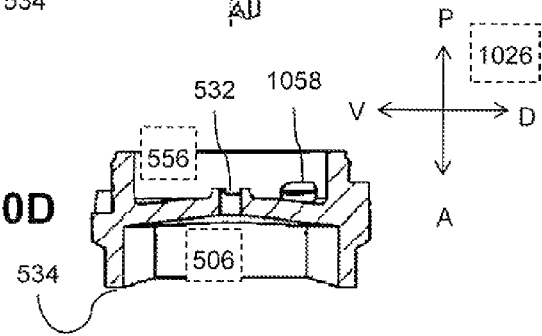
Figure 10E:
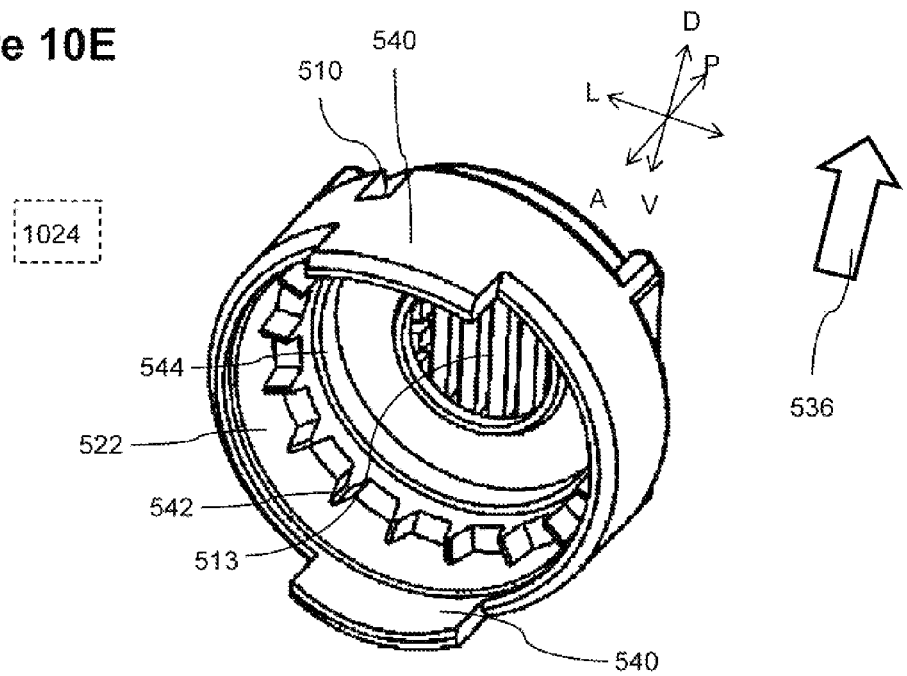
FIG. 10E is an anterior perspective view of a round flow restrictor cover in accordance with an embodiment of the present invention.
Figure 10F:
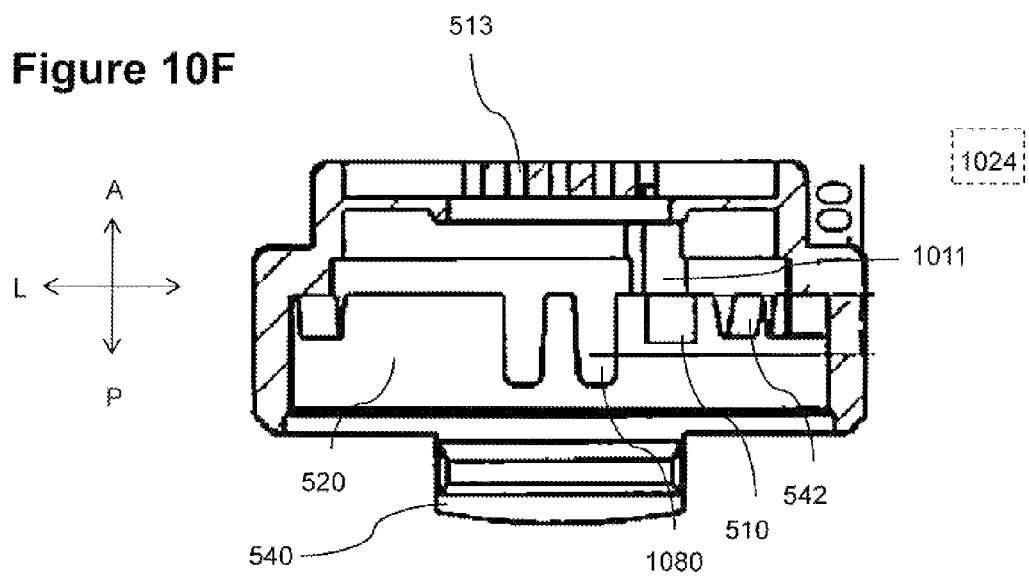
FIG. 10F is a cross section view of a round flow restrictor cover in accordance with an embodiment of the present invention.

FIGS. 10B-D are orthogonal views of a round flow restrictor core in accordance with an embodiment of the present invention. FIG. 10E is an anterior perspective view of a round flow restrictor cover 1024 in accordance with an embodiment of the present invention.

FIG. 10F is a cross section view of a round flow restrictor cover in accordance with an embodiment of the present invention. Cover 1024 optionally includes a duct 1011 that provides fluid communication from inlet openings 513 and/or the posterior side of membrane 552 to inlet 510 and/or beginning 1076 of flow resisting fluid path 1008. Optionally when cover 1024 is fit over core 1026, an aligning element 1080 grasps and/or aligns with and/or seals to divider 546. Aligning element 1080 to divider 546 may align baffles 542 (for example in between) to baffles 543. Optionally, element 1080 may close over and/or seal over divider 546 preventing and/or impeding short circuit flow from inlet 510 and/or duct 1011 to opening 1068.

Figure 10G:
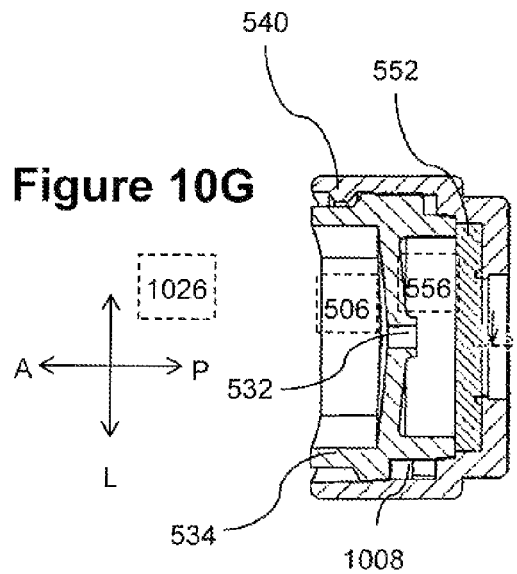
FIGS. 10G and 10H are orthogonal views of a round flow restrictor in accordance with an embodiment of the present invention.
Figure 10H:
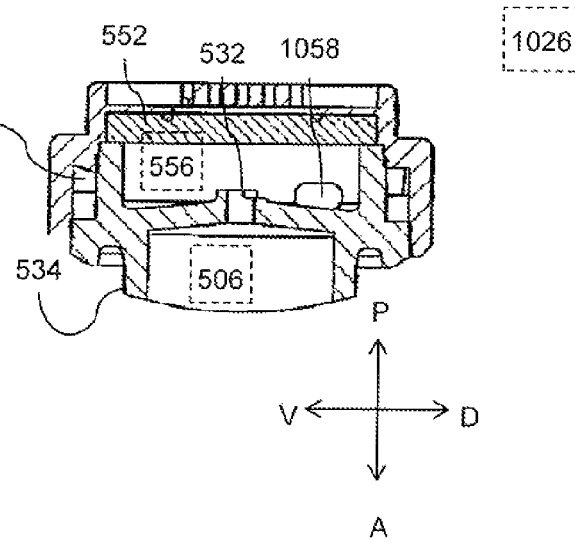

FIGS. 10G and 10H are orthogonal views of a round flow restrictor in accordance with an embodiment of the present invention.

Figure 11A:
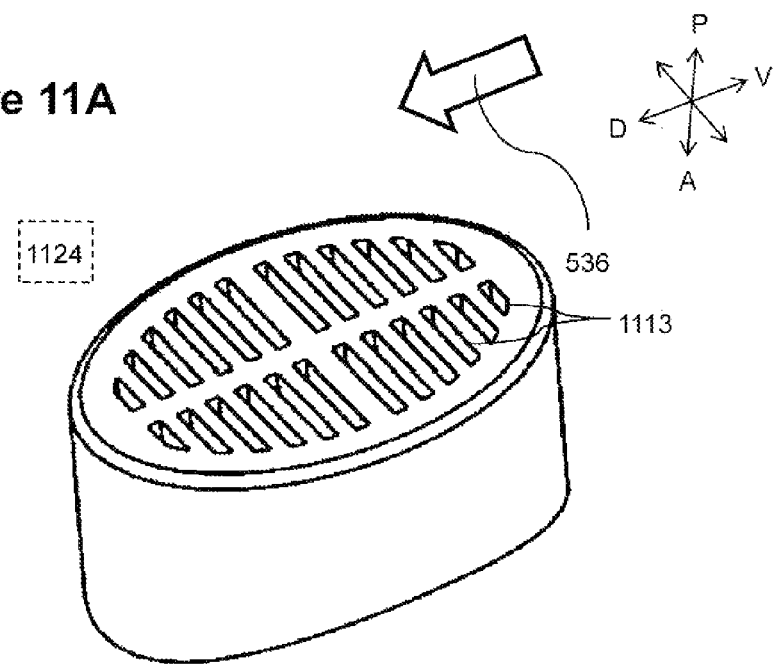
FIG. 11A is a lateral perspective view of an elliptical flow restrictor cover in accordance with an embodiment of the present invention.
Figure 11B:
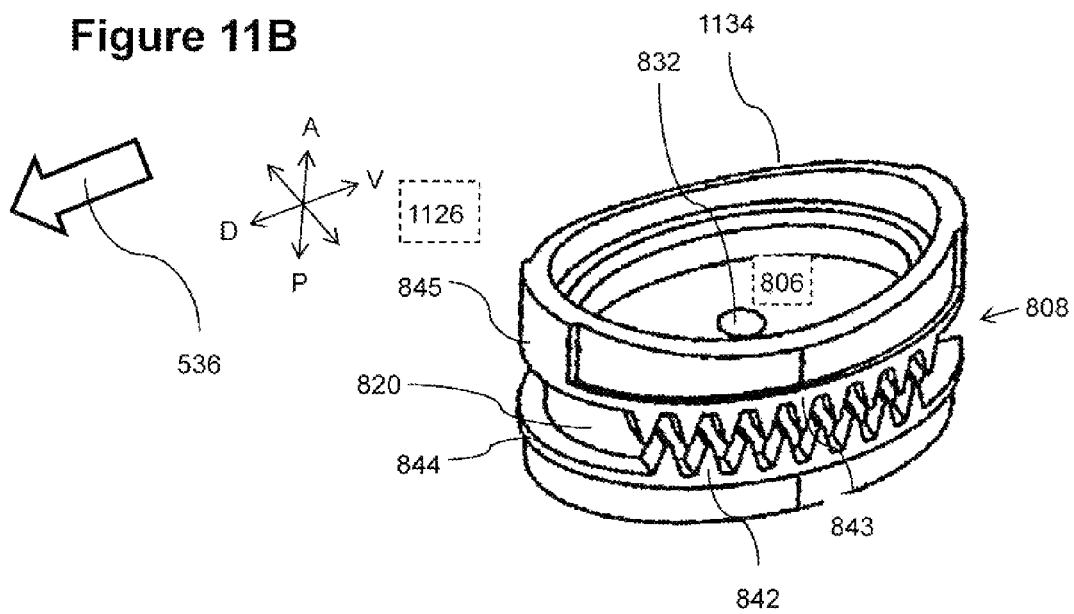
FIG. 11B is a lateral perspective view of an elliptical flow restrictor core in accordance with an embodiment of the present invention.

FIGS. 11A and 11B are lateral perspective views of an elliptical flow restrictor cover 1126 and core 1124 respectively in accordance with an embodiment of the present invention. For example the flow resistor of FIGS. 11A-D may be an autonomous drip emitter. Optionally a closed periphery 1134 of outlet chamber 806 may be attached to an inner conduit wall. Optionally cover 1124 may include a duct (for example a groove) providing fluid communication between inlet openings 1113 and the beginning of fluid path 808. Optionally the long axis of the resistor will be aligned with mean flow in the conduit.

FIG. 11C is a lateral view of an elliptical flow restrictor core in accordance with an embodiment of the present invention and FIG. 11D is a cross sectional view of the elliptical flow restrictor core (cut along line BF) in accordance with an embodiment of the present invention. It can be seen that baffles 842 and/or 843 and/or divider 846 are oriented to facilitate lateral removal of mold parts.

Emitters

Emitters may be divided into various categories. In line emitters may be installed in a conduit during manufacture. On line emitters may be added to a conduit after manufacture. In line emitters may include embedded restrictors. In line emitters include cylindrical insert sleeves that are optionally attached to the entire inner circumference of the conduit and/or at least half of the inner circumference of the conduit and/or opposing points on the inner surface of the conduit. In line emitters may include embedded emitters that may be embedded into the wall of a conduit. For example the majority of the thickness of an embedded emitter may protrude out from the inner passageway of the conduit.

In line drippers may include flat emitters that are attached to a small portion of the inner circumference of the conduit. Such drippers often have an elongated rectangular form. The majority of the thickness of the emitter may protrude into the inner pathway of the conduit. Emitters may be further divided according to whether they include a self contained flow restrictor. A self contained flow restrictor is not dependent on connection to a conduit wall. Conduit dependent flow restrictors may depends on connection to a conduit wall. For example a conduit dependent flow restrictor may include a pressure reducing labyrinth which employs the conduit wall to confine a labyrinth flow restrictor.

Self contained button emitters (sometimes referred to a cylindrical emitters and/or disk emitters) may be used as in line emitters. Self contained button drippers may have significant advantages. For example button drippers may include a labyrinth flow path set between two cylindrical and/or curved surfaces. In some embodiments tight sealing cylindrical and/or curved surfaces can be formed from molded plastic. For example, an initial labyrinth flow path may be formed between two plastic curved surfaces without an expensive flexible membrane and/or gasket. In some embodiments of a button dripper a small flexible membrane may cover only the regulating portion of a flow restrictor. This may save production costs compared to, for example, elongated emitters that in some cases may use a larger membrane to cover and/or seal various portions of the flow restrictor, for example including an initial labyrinth.

The external casing of a button type flow restrictor may optionally be symmetrical about an axis. In some embodiments, button drippers include an outlet that is also symmetrical around the same axis as the flow restrictor. For example, conventional outlets may have a flat and/or dome shape.

In some embodiments, flat or domed button drippers are bonded to the inside of a conduit is by locally deforming the conduit and or embedding the emitter mostly and or entirely into the wall of the conduit.

In some embodiments of the present invention the button dripper may include a coupler including an outlet zone with a vaulted and/or arched profile. The arched profile may not have radial symmetry around the same axis as the button flow restrictor. For example, the outlet zone may be arched to conform to a cylindrical inner surface of a hose.

In some embodiments of the present invention, a self contained button flow restrictor may be joined to a coupler for connection to the wall of a conduit as an in line emitter. The self contained button flow restrictor may optionally produce reliable flow without being sensitive to the quality and/or depth of bonding to a conduit. The coupler may optionally include a surface that facilitates alignment and/or bonding to a conduit wall and/or produces an outlet zone that is suited to perforation by automated machinery. The coupler may optionally bond to the wall without significantly changing the external properties of the conduit.

In some embodiments the fluid outlet of the coupler may be shaped to match the inside curvature of the conduit wall. For example, the fluid outlet may include a rim and/or a periphery and/or a bonding surface arched to lie on a virtual cylindrical surface. The virtual surface may match the inner cylindrical surface of the conduit. Optionally the coupler surface may bond to less than less than half of the circumference of the conduit. Optionally, fitting the outlet to the curvature of the conduit may allow a larger outlet zone and/or bonding surface with less disturbance to the external properties of the conduit.

In some embodiments an irrigation hose may include a plurality of in hose drip emitters. Optionally, the hose may retain flexibility (for example the bonding zone may be configured so as to not constitute a large inflexible zone). Optionally, the hose may retain a smooth outer geometry, allowing it to be handled and/or stored like conventional hoses. For example the hose may bend enough to be rolled in a standard manner.

Some embodiment of the current invention may include a two part labyrinth. Optionally baffles on each part of a two part labyrinth may be oriented in a single direction. In some embodiments, when assembled together two relatively simple parts may provide a winding labyrinth of baffles having different orientations.

Some embodiments of a flow restrictor may be designed to facilitate production. For example a labyrinth flow path may be formed having baffles of differing orientations with easily molded parts wherein on a given part, feature have similar orientation and/or a labyrinth path may be molded on two sides of a piece having orientation to assist in mold removal.

The two part labyrinth may optionally be confined between two parts, for example body having a cylindrical outer surface and a cover having a cylindrical inner cavity.

Optionally intervening baffles on the two parts may form a winding fluid pathway. The fluid pathway may optionally circle the cylindrical surface. The fluid pathway may optionally wind along the cylindrical surface.

Alternatively or additionally, the cylindrical surface may include a conical portion and/or an irregular convex portion. For the sake of the description herein, cylindrical may include for example a truncated cone having an aperture of 0-10°. Optionally the directrix of the cylinder may not be circular.

Caveats

It is expected that during the life of a patent maturing from this application many relevant technologies will be developed and the scope of the terms are intended to include all such new technologies a priori.

As used herein the term "about" refers to ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A drip emitter comprising:
   A) a core having an elliptical cross section having a side with a curved outer surface, said cross section with a long axis and a short axis and wherein a ratio of said long axis and short axis is at least 1.1 to 1;
   B) a cover including a cavity having a curved inner surface, said curved inner surface fitting at least a portion of said curved outer surface of said core;
   C) a flexible membrane and
   D) a regulating chamber having an open face closed by said flexible membrane; said flexible membrane exposed to pressure from an external fluid source;
   E) at least one labyrinth flow channel at least partially circling a longitudinal axis of said elliptical cross section; said labyrinth flow channel enclosed in an annular region between said at least a portion of said curved outer surface of said core and said curved inner surface of said cavity, said labyrinth flow channel having an open face such that when said core is fit into said cavity, said open face of said labyrinth flow channel is closed by said curved inner surface to form a closed conduit providing fluid communication between said fluid source and said regulating chamber.

2. The drip emitter of claim 1, wherein said regulating chamber is formed on an end of said core.

3. The drip emitter of claim 1, further comprising:
   F) a fluid outlet chamber in fluid communication with said regulating chamber; said fluid outlet chamber having an open face suitable for bonding to an inner surface of an irrigation conduit, said open face on a second end of said core opposite said regulating chamber.

4. The drip emitter of claim 1, where said ratio of said long axis to said short axis is less than 4.

5. The drip emitter of claim 1, wherein said at least one open faced labyrinth flow channel includes a rate limiting fluid path producing a predefined range of flow rate over a predefined pressure differential range between said external fluid source and said regulating chamber and said cover includes a mount sized to engage said core from at least two opposing sides thereof with said core oriented for aligning a fluid outlet of said cover to an inlet of said core.

6. The drip emitter of claim 1, wherein said curved inner surface includes opposing surfaces for holding said core by compression.

7. The drip emitter of claim 1, wherein said cover has the form of a sleeve insertable into an irrigation conduit.

8. The drip emitter of claim 1, wherein said cover has the form of a sleeve insertable into an irrigation conduit and wherein said cover includes an outlet chamber that surrounds at least 70% of a circumference of said sleeve.

9. The drip emitter of claim 1, wherein said long axis is oriented substantially parallel to a mean flow direction in an irrigation conduit.

10. The drip emitter of claim 1, wherein said cover further includes:
    iv) a slow release ingredient at a concentration at least 20 times the concentration in said core.

11. The drip emitter of claim 1, wherein said cover further includes a fluid duct connecting between said external fluid source and an rate limiting fluid path.

12. The drip emitter of claim 2, wherein said closed conduit is at least partially delimited in the direction opposite said open face of said regulating chamber by at least on feature selected from a baffle and a sealing ring; said feature protruding outward from said curved outer surface.

13. The drip emitter of claim 2, wherein said closed conduit is at least partially delimited in the direction of said open face of said regulating chamber by at least one feature selected from a baffle and a sealing ring; said feature protruding outward from said curved outer surface.

14. The drip emitter of claim 2, wherein said closed conduit is at least partially delimited in the direction of said open face of said regulating chamber by an inward protrusion from said curved inner surface.

15. The drip emitter of claim 3 wherein said fluid outlet chamber is suitable for bonding to an inner surface of said irrigation conduit with a long axis of said elliptical cross section directed substantially parallel to the main flow direction in said irrigation conduit and wherein said bonding is to less than 45 degrees of a circumference of the irrigation conduit.

16. The drip emitter of claim 15, further comprising
    G) a fluid inlet formed is said cover in fluid communication with said closed conduit and providing said exposure of said membrane to said pressure.

17. The drip emitter of claim 3, wherein said regulating chamber interposes between said closed conduit and said outlet chamber.

18. The drip emitter of claim 5, wherein said cover further includes:
    iii) an open faced inlet chamber suitable for sealing to said inner surface of an irrigation conduit, said inlet chamber providing fluid communication between said inlet of said core and said fluid outlets of said cover.

19. The drip emitter of claim 5, wherein said cover further includes:
    iii) an open faced outlet chamber suitable for sealing to an inner surface of an irrigation conduit, said outlet chamber providing fluid communication between said outlet chamber of said core and an outlet opening of said irrigation conduit.

20. The drip emitter of claim 8, further including:
    iv) a longitudinal extension of said sleeve and wherein said outlet chamber surrounds at least 90% of a circumference of said longitudinal extension.

21. The drip emitter of claim 10, wherein said slow release ingredient includes an at least one ingredient selected from the list consisting of an herbicide and a biocide.

\* \* \* \* \*